(12) United States Patent
Abeles et al.

(10) Patent No.: US 11,807,361 B2
(45) Date of Patent: Nov. 7, 2023

(54) VISION BASED CALIBRATION SYSTEM FOR UNMANNED AERIAL VEHICLES

(71) Applicant: ZIPLINE INTERNATIONAL INC., South San Francisco, CA (US)

(72) Inventors: Peter Abeles, Redwood City, CA (US); Keenan Wyrobek, Half Moon Bay, CA (US)

(73) Assignee: Zipline International Inc., South San Francisco, CA (US)

( * ) Notice: Subject to any disclaimer, the term of this patent is extended or adjusted under 35 U.S.C. 154(b) by 414 days.

(21) Appl. No.: 17/062,887

(22) Filed: Oct. 5, 2020

(65) Prior Publication Data

US 2021/0070440 A1 Mar. 11, 2021

Related U.S. Application Data

(63) Continuation of application No. 16/017,831, filed on Jun. 25, 2018, now Pat. No. 10,793,269, which is a (Continued)

(51) Int. Cl.
*B64C 39/02* (2023.01)
*G06T 7/73* (2017.01)
(Continued)

(52) U.S. Cl.
CPC .............. *B64C 39/024* (2013.01); *B64F 5/60* (2017.01); *G06T 7/73* (2017.01); *B64U 70/00* (2023.01); *B64U 80/00* (2023.01); *B64U 2201/20* (2023.01); *G06T 2207/30204* (2013.01); *G06T 2207/30252* (2013.01)

(58) Field of Classification Search
CPC . B64C 39/024; B64F 5/60; G06T 7/73; G06T 2207/30204; G06T 2207/30252; B64U 70/00; B64U 80/00; B64U 2201/20
See application file for complete search history.

(56) References Cited

U.S. PATENT DOCUMENTS 7,643,893 B2 1/2010 Troy et al.
8,103,127 B2 1/2012 Yonezawa et al.
(Continued)

OTHER PUBLICATIONS

International Search Report and Written Opinion issued in International Application No. PCT/US2017/023855 dated Sep. 18, 2017 (21 pages).

*Primary Examiner* — Michael V Kerrigan
(74) *Attorney, Agent, or Firm* — Dorsey & Whitney LLP

(57) ABSTRACT

A system includes a camera configured such that a field of view of the camera is positioned to capture a base portion and a movable portion of an aircraft. A computer communicatively connected to the camera is configured to determine a relative orientation between a base identification feature of the base portion and a movable identification feature of the movable portion of the aircraft based on image data received from the camera. The computer is also configured to determine a position of the movable portion of the aircraft based on the relative orientation between the base identification feature and the movable identification feature and a position of the base portion and to compare the position of the movable portion to a reported position for the movable portion to determine a variance. An aircraft control system is configured to monitor a state of the aircraft based on the variance.

21 Claims, 14 Drawing Sheets

Related U.S. Application Data continuation of application No. 15/229,099, filed on Aug. 4, 2016, now Pat. No. 10,029,788.

(60) Provisional application No. 62/314,323, filed on Mar. 28, 2016.

(51) Int. Cl.
*B64F 5/60* (2017.01)
*B64U 70/00* (2023.01)
*B64U 80/00* (2023.01)

(56) References Cited

U.S. PATENT DOCUMENTS

| | | |
|---|---|---|
| 8,201,424 B2 | 6/2012 | Bodden et al. |
| 8,566,054 B1 | 10/2013 | Schweigert et al. |
| 9,449,438 B2 | 9/2016 | Catt et al. |
| 2013/0083960 A1 | 4/2013 | Kostrzewski et al. |

VISION BASED CALIBRATION SYSTEM FOR UNMANNED AERIAL VEHICLES

CROSS-REFERENCE TO RELATED APPLICATIONS

This application is a continuation patent application of U.S. Non-provisional application Ser. No. 16/017,831, filed Jun. 25, 2018, and titled "Vision Based Calibration System for Unmanned Aerial Vehicles", issued as U.S. Pat. No. 10,793,269 on Oct. 6, 2020, which is a continuation patent application of U.S. Non-provisional application Ser. No. 15/229,099, filed Aug. 4, 2016, issued as U.S. Pat. No. 10,029,788 on Jul. 24, 2018, and titled "Vision Based Calibration System for Unmanned Aerial Vehicles," which claims the benefit to U.S. Provisional Patent Application No. 62/314,323, filed Mar. 28, 2016, and titled "Unmanned Aircraft System for High Volume Operations," the disclosures of each of which are hereby incorporated herein by reference in its entirety.

TECHNICAL FIELD

This disclosure relates to a vision based calibration system for Unmanned Aerial Vehicles (UAVs) that is designed for reliable, high-volume operations.

BACKGROUND

Autonomous aerial vehicles have been gaining popularity in the last few years. UAVs have gone from a rarity to a common sight. UAVs are used not only by hobbyists and recreational flyers, but also by governments and businesses, for purposes such as surveillance, mapping, and most recently, aerial delivery.

In order to conduct high volume operations economically with a Unmanned Aircraft System (UAS), the UAVs and ground equipment must be designed in a way that allows for the aircraft to be easily tested, calibrated, launched, and recovered.

SUMMARY

Embodiments discussed herein are related to methods and systems for vision based calibration and testing of UAVs. In one embodiment a camera is configured to be positioned relative to a vehicle (e.g. a UAV) such that a base fiducial and a movable fiducial on the vehicle are visible within a field of view of the camera. A testing and calibration computer is then used to receive an image of the base fiducial and the movable fiducial from the camera. The image comprises image data. The computer then determines a relative orientation between the base fiducial and the movable fiducial based on the image data.

The relative orientation between the base fiducial and movable fiducial, and position information about a base surface of the vehicle, is used to determine a real position of a movable part of the vehicle. The real position of the movable part is compared to a reported position for the movable part and a notification is generated if the difference between the real position and reported position is greater than a threshold amount.

A system described herein includes a camera configured such that a field of view of the camera is positioned to capture a base portion and a movable portion of an aircraft. A computer communicatively connected to the camera is configured to determine a relative orientation between a base identification feature of the base portion and a movable identification feature of the movable portion of the aircraft based on image data received from the camera. The computer is also configured to determine a position of the movable portion of the aircraft based on the relative orientation between the base identification feature and the movable identification feature and a position of the base portion and to compare the position of the movable portion to a reported position for the movable portion to determine a variance. An aircraft control system is configured to monitor a state of the aircraft based on the variance.

A method described herein captures, with a camera, an image of a first portion of an aircraft including a first identification feature and a second portion of the aircraft including a second identification feature, where the image includes image data. A computer communicatively connected to the camera determines, using the image data, a position of the second portion of the aircraft based on a relative orientation between the first identification feature and the second identification feature. A state of the aircraft is updated based at least on the position of the second portion of the aircraft.

A method for predicting failures in a movable portion of an aircraft includes a data collection process, a model development process, and a diagnostic process. The data collection process includes capturing, with a camera, an image of a base identification feature of a base portion of the aircraft adjacent to the movable portion and a movable identification feature of the movable portion, where the image includes image data. A relative orientation between the base identification feature and the movable identification feature is determined based on the image data. A real position of the movable portion of the aircraft is determined based on the relative orientation between the identification features and a known real position of the base portion of the aircraft. An actuator variance is generated based on a difference between the real position of the movable portion and a reported position for the movable portion. The model development process includes executing the data collection process a plurality of times over a period of time for the movable portion of the aircraft and storing a plurality of actuator variances generated by the data collection process over the period of time, observing a failure in the movable portion, and developing a predictive model based on the stored plurality of actuator variances. The diagnostic process includes executing the data collection process a second plurality of times for a second movable portion of a second aircraft over a second period of time and storing a second plurality of actuator variances generated by the data collection process over the second period of time. The predictive model is applied to the second plurality of actuator variances and a notification is generated based on output of the predictive model.

BRIEF DESCRIPTION OF THE DRAWINGS

The figures use like reference numerals to identify like elements. A letter after a reference numeral, such as "100*a*," indicates that the text refers specifically to the element having that particular reference numeral. A reference numeral in the text without a following letter, such as "100," refers to any or all of the elements in the figures bearing that reference numeral (e.g. "100" in the text refers to reference numerals "100*a*" and/or "100*b*" in the figures).

DETAILED DESCRIPTION

While the present disclosure has been described with reference to various embodiments, it will be understood that these embodiments are illustrative and that the scope of the disclosure is not limited to them. Many variations, modifications, additions, and improvements are possible. Modules and procedures may be separated or combined in different ways in various embodiments, or described with different terminology. These and other variations, modifications, additions, and improvements may fall within the scope of the disclosure as defined in the claims that follow.

This document describes a testing and calibration system designed for use with a high volume UAS operation. The UAS includes a UAV designed to operate substantially independently of a ground operator, a testing and calibration system, a UAV launcher, and a recovery system. The system also includes software components, some that may execute on the UAV, some that may execute on computer servers running locally, and some that may execute on remote cloud servers.

The UAS described herein provides a platform for performing various target functions, including, but not limited to, package delivery, data capture, mapping, surveillance, and infrastructure provisioning. While specific embodiments of the UAS system are described herein, some embodiments may comprise systems and methods that are not generally relevant to every target function. One skilled in the art will readily recognize the relevance of a recited system or method in relation to the target functions.

Unmanned Aerial System (UAS)

The UAS disclosed in this document is an example implementation of an unmanned aircraft system designed for safe, reliable, high-volume operations. In this embodiment the aircraft are fixed-wing UAVs, but the UAS may also be used in conjunction with other aircraft designs, such as quad copters, lighter-than-air vehicles (such as blimps), gliders, tilt-rotor aircraft, etc. Moreover, as used herein, the term "autonomous" may refer to operations of an unmanned vehicle that are performed by the vehicle without user intervention and/or control, as well as to describe vehicles that are designed to operate without human intervention and/or control for all or portions of their missions. Accordingly, a vehicle and/or a system may be described as autonomous even though a human operator may choose to override the vehicle's autonomous control.

Figure 1A:
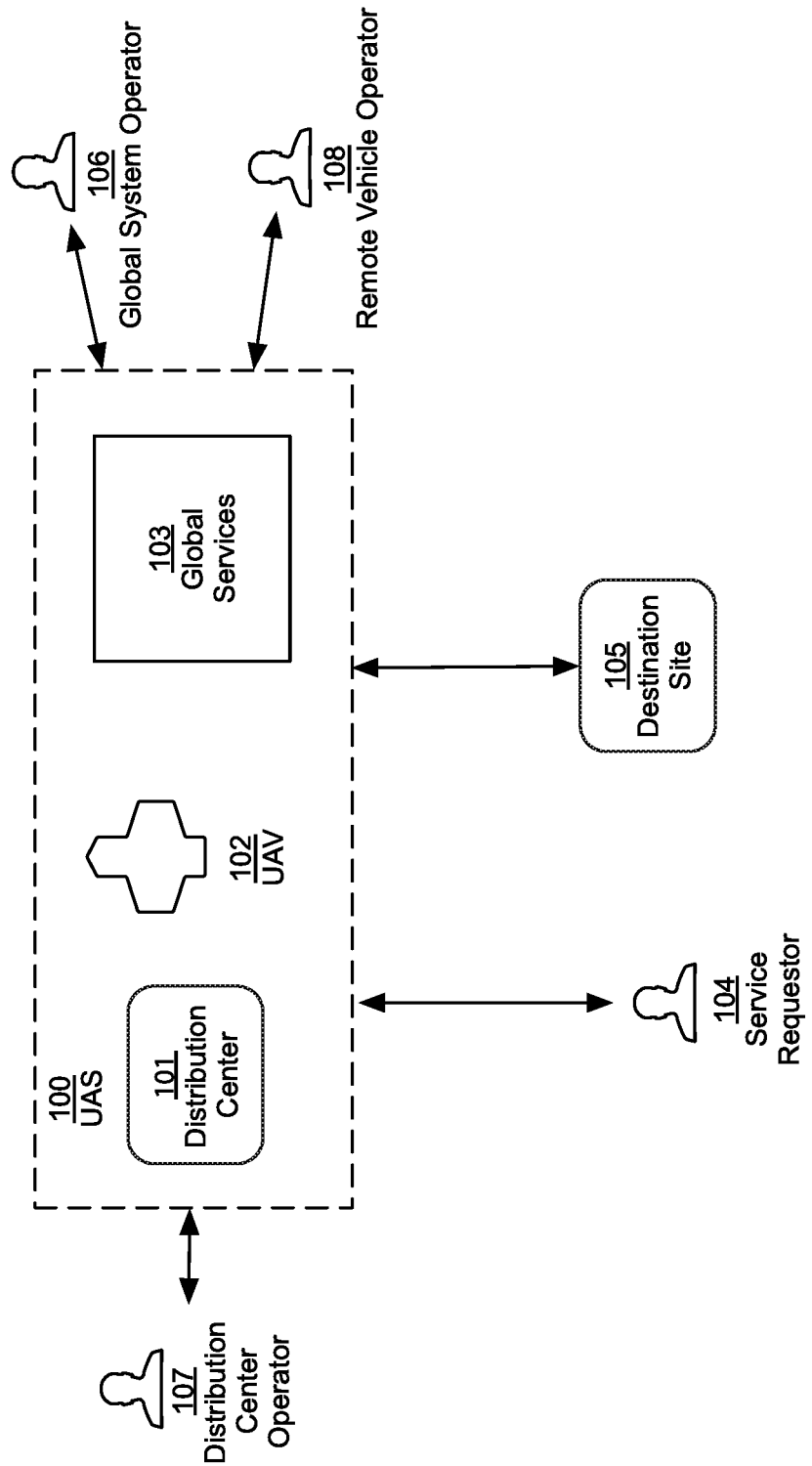
FIG. 1A is a diagram illustrating the components of a UAS and entities that may interface with it, according to one example embodiment.

FIG. 1A illustrates an embodiment of a UAS and interfacing entities. In this embodiment, the UAS 100 receives a service request from a service requestor 104 and deploys a UAV 102 to fulfill that request. In the event that the UAV 102 encounters a situation that its onboard automation cannot understand or handle (or a human operator becomes aware of a situation that warrants human intervention), the UAS 100 is able to provide human intervention by selecting a remote vehicle operator 108 who can issue commands to the UAV 102. In this embodiment, the UAS 100 comprises a distribution center 101, a UAV 102, and global services 103.

The service requestor 104 is a human user or an autonomous system that issues a service request to the UAS 100. In the case where the service requestor 104 is a human user, that user may use a remote client device such as a mobile phone, tablet, or personal computer to issue the request. A service request is an instruction to the UAS 100 to provide some service at the destination site 105. The destination site 105 may be any designated location, such as a portion of open ground, a building, a mailing address, a Global Positioning System (GPS) coordinate, or a slice of airspace. In some embodiments, the destination site 105 is the location of a beacon device. The beacon device may be any device that emits a signal that can be used to track or identify a location, such as for example a transponder, a mobile phone, etc. The destination site 105 may also be designated by identifying a particular object, such as, for example, a designated vehicle, a mailbox, a delivery pad, or some other target object that can be tracked to indicate a target location for a service. In another embodiment, the destination site 105 is the location of the service requestor 104, although this need not be the case. Although one service requestor 104 and one destination site 105 are illustrated in this embodiment, in practice there can be many service requestors 104 and destination sites 105.

The requested service may be any service that can be provided from an airborne platform. For example, in one embodiment, the service request issued by the service requestor 104 is a request to deliver a package containing a specific payload to the destination site 105. In another embodiment, the service request is a request to capture image data using a camera mounted on the UAV 102, at the destination site 105 or along a route to and from the destination site 105. In yet another embodiment, the service request is a request to provide an Internet access point at the destination site 105 using a Wi-Fi gateway mounted on the UAV 102. Many other services can be provided using the UAS 100 at the destination site 105, such as package pickup, surveillance, mapping, data capture using UAV-mounted instruments, etc.

The UAV 102 is an Unmanned Aerial Vehicle. The UAV 102 can be implemented using a variety of systems and airframes. Almost any practical flying platform can be used as the vehicle base for the UAV 102, including gliders, airplanes, balloons, helicopters, etc. In one embodiment, the UAV 102 is implemented using a fixed-wing aircraft with redundant propulsion systems that is optimized for long-range flight. In another embodiment, the UAV 102 is implemented using a quad-rotor aircraft that is optimized for short-range flight and vertical takeoff and landing. In yet another embodiment, the UAV 102 is implemented using a hybrid fixed-wing aircraft, with tilt-rotors, capable of both long-range flight and vertical takeoff and landing. In another embodiment, the UAV 102 is implemented using a fixed-wing aircraft with fixed horizontally oriented motors, configured to provide horizontal thrust, and separate fixed vertically oriented motors configured to provide vertical thrust. The UAV 102 may also be implemented using a lighter than-air-platform such as a balloon, blimp, or other dirigible. One purpose of the UAV 102 in the UAS 100 is to serve as a flexible platform that can be rapidly deployed on demand, with minimum human involvement.

Although the UAV 102 is an autonomous vehicle that is designed to operate without human assistance in most scenarios, it may occasionally require the intervention of a human controller or pilot. For instance, a global systems operator 106 or a distribution center operator 107 may issue a recall command to the UAV 102 while it is on a mission, due to some external issue, such as inclement weather, a canceled delivery, etc. The UAV 102 may also proactively request human assistance while it is on its mission. For example, the UAV 102 may encounter an environment where its vision and/or navigation algorithms cannot produce a path with a high degree of reliability. In such a scenario, the UAV 102 will send a request for assistance to the global services 103. The global services 103 will select a remote vehicle operator 108 to handle the situation, and that operator can send the UAV 102 one or more commands to help it navigate its environment.

The UAV 102 may carry any suitable payloads, depending on the nature of the service request received from the service requestor 104. Components of the UAV 102 are explained in more detail in the description for FIGS. 2A-2D. Although a single UAV 102 is depicted in FIG. 1A, there may be more than one UAV 102 in a UAS 100.

The distribution center 101 is a fixed or mobile facility that facilitates the launch, recharge, communications, repair, and payload logistics for the UAV 102. The distribution center 101 is explained in further detail in the description for FIG. 3. Although a single distribution center 101 is shown in FIG. 1A, there may be more than one distribution center 101 in the UAS 100. In one embodiment, each UAV 102 in the UAS 100 is based at a single distribution center 101, and is repaired, reloaded, and recharged at that distribution center 101. In another embodiment, each UAV 102 can be repaired, reloaded, and recharged at any distribution center 101 in the UAS 100, and UAVs 102 may be routed between distribution centers 101 based on the logistical requirements of current service requests and the projected requirements for future service requests. Each distribution center 101 may have a launcher system and a recovery system that are capable of automated, reliable, high-volume launches and recoveries of UAVs 102. Each distribution center 101 may also include equipment for testing and calibration of UAVs 102 prior to launch and/or after recovery.

The global services 103 may be comprised of one or more computer server systems, running software services (i.e. computer software programs), accessible through the Internet, which provide offsite support, administration, air traffic control, communications, data storage and logistics functions for the distribution centers 101 and the UAVs 102. In one embodiment, the global services 103 route a service request from a service requestor 104 to a distribution center 101 that is geographically adjacent to (or in relative geographic proximity to) the destination site 105.

The global services 103 may also receive requests for assistance from the UAV 102 while it is on its mission. Based on such requests, the global services 103 will select a remote vehicle operator 108 from a pool of operators, and provide data about the UAV 102's environment to the remote vehicle operator 108. Based on this provided data, the remote vehicle operator 108 can provide one or more commands to the UAV 102 to help it surmount any problems that its on-board intelligence cannot handle. The global services 103 are explained in more detail in the description for FIG. 4.

The global system operator 106 may be a human user that monitors and operates the UAS 100 to ensure the correct and efficient functioning of the system. For example, in some embodiments, the global system operator 106 may monitor the UAS 100 through the computer servers of the global services 103, to ensure that a distribution center 101 has the appropriate payload in stock to fulfill a service request from a service requestor 104. In one example embodiment, the global system operator 106 may use the global services 103 to route new stock of a particular payload to a distribution center 101 in anticipation of that payload stock being depleted.

There may be more than one global system operator 106, and the global system operators 106 may monitor and provide services for multiple distribution centers 101, UAVs 102, and service requestors 104.

The distribution center operator 107 is a human user that monitors and operates the distribution center 101. The distribution center operator 107 may ensure that the UAS 100 components that are local to the distribution center 101 function correctly. This includes the UAVs 102 based at the distribution center 101, as well as other components such as launchers, recovery systems, testing and calibration systems, rechargers, payloads, etc. The distribution center 101 provides systems and methods to facilitate the tasks of the distribution center operator 107. For example, in some embodiments, the distribution center operator 107 operating a distribution center 101 is provided with an operator interface that allows her to determine the inventory of each type of payload at that distribution center 101, and that enables her to order more of any type of payload that is in short supply. The distribution center operator 107 may also operate the launcher system, recovery system, and testing/calibration systems located at that distribution center 101 using the operator interface. The distribution center systems and methods that facilitate the distribution center operator 107's work are explained in more detail in the description for FIG. 3.

The remote vehicle operator 108 is a human user that receives information about the UAV 102 from the global services 103 and may issue commands to the UAV 102 to help it complete its mission. In one embodiment of the system there is a pool of available remote vehicle operators 108 that can provide assistance to any UAV 102 in the system. When the global services 103 receive a request for assistance from a UAV 102, it selects from among the available remote vehicle operators 108 and routes the request to that operator. The remote vehicle operator 108 reviews information about the circumstances of the UAV 102 and sends one or more commands to the UAV 102. Based on these commands, the UAV 102 takes actions that help it to complete its mission. In one embodiment, the roles of the global system operators 106 and the remote vehicle operators 108 are merged.

Figure 1B:
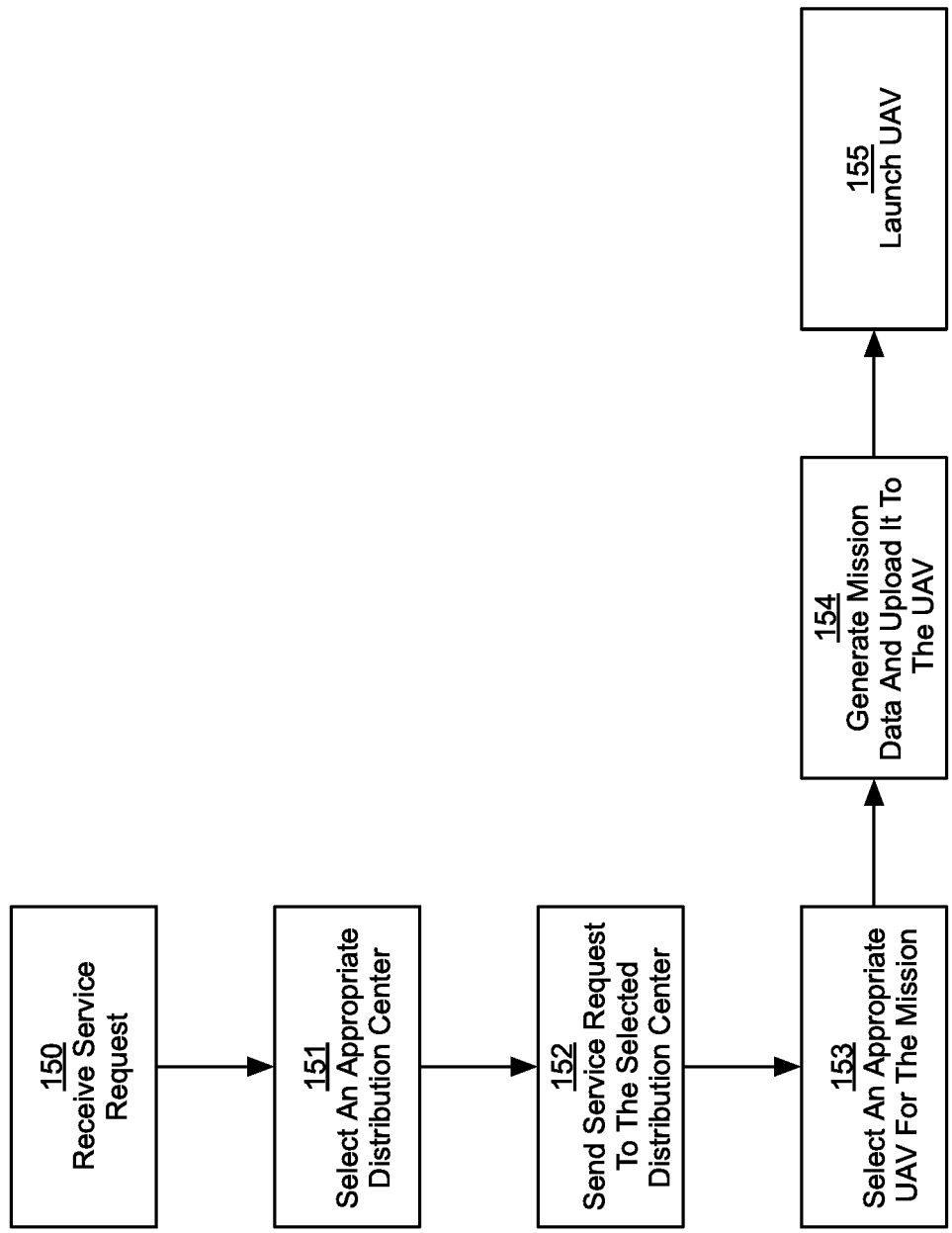
FIG. 1B is a diagram illustrating a UAV launch process, according to one example embodiment.

FIG. 1B illustrates one embodiment of a UAV launch process implemented by the UAS 100. As an initial step, the global services 103 of the UAS 100 receive 150 a service request from a service requestor 104. The service request specifies a destination site 105, which designates the location where the service is to be delivered. As described herein, the service request may also include payload information, corresponding to a payload requested by the service requestor. The global services 103 then select 151 a suitable distribution center 101 from which to fulfill the service request. In some embodiments, the global services 103 select 151 the distribution center 101 from which to fulfill the service request by determining the distribution center 101 that is closest to the location of the destination site 105. In another embodiment, the global services 103 select 151 a distribution center 101 to fulfill the service request by taking into account both the proximity of the distribution center 101 to the destination site 105 as well as an inventory at the distribution center 101 that indicates the availability of a payload specified in the service request. For example, if the service request is a request to deliver a specific type of item to the destination site 105, the global services 103 will select the distribution center 101 from those distribution centers that are near the destination site 105 and that have the requested item in their inventory. Other factors can also be used to select a distribution center 101, such as, for example, the local weather conditions and air traffic at the distribution centers 101.

Once a distribution center 101 is selected 151, at least a portion of the information in the service request is sent 152 to that distribution center 101. In addition to the destination site location and payload information, the service request may contain other information that is useful at the distribution center 101 for the fulfillment of the service request. For example, in some embodiments, the service request further comprises a time designating when the service request should be fulfilled at the destination site 105.

A UAV 102 can be selected 153 to fly a mission to fulfill the request, either during the distribution center selection process or afterwards. The UAV 102 that will fly the mission may be selected 153 based on one or more criteria that are relevant to the service request and/or system efficiency. For example, in one embodiment, the UAV 102 is selected 153 based on the charge level of its battery and the distance to the destination site 105. In another embodiment, the UAV 102 is selected 153 based on the instruments that are installed on its airframe and a type of data capture specified in the service request. In yet another embodiment, the UAV 102 is selected 153 based on a package in its payload matching a package specified for delivery in the service request.

In an alternative embodiment, the UAS 100 does not select from pre-configured UAVs for a given mission. Instead, either the distribution center 101 or the global services 103 determine a set of components that are required to complete the service request, and the distribution center 101 causes a UAV comprising the required components to be assembled for the mission. For example, if the destination site 105 is a certain distance from the distribution center 101, the UAV for the mission can be configured with a suitable battery pack and engines to complete a round-trip flight to that destination.

The selection 153 of the UAV 102 may occur after the selection 151 of the distribution center, or may be used as a factor in selecting 151 the distribution center 101. For example, the distribution center 101 may be selected 151 from only those distribution centers that have a particular type of UAV airframe, UAV battery, or UAV engine, based on the weight of a payload required by the service request.

Once the UAV 102 is selected 153 for the mission, mission data is generated 154 for it. The mission data is information that enables the UAV 102 to navigate to the destination site 105 and fulfill the service request. In some embodiments, the mission data includes GPS coordinates for the destination site 105 as well as flight corridor information facilitating navigation to those GPS coordinates. The flight corridor information is discussed in more detail in the descriptions for FIG. 2D and FIG. 3. Further details related to the mission data are discussed in the descriptions for FIG. 2D, FIG. 3, and FIG. 4. After the mission data is generated 154, it is uploaded into a database on the UAV 102.

Once the mission data is generated and uploaded 154, the UAV 102 is launched 155. From the time the UAV 102 is launched and until it lands again, it is considered to be on a mission to complete the service request. In one embodiment, the UAV 102 may be launched with a mission to fulfill more than a single service request. In another embodiment, at least a part of the mission data is uploaded and perhaps even generated, after the UAV 102 is launched 155.

Unmanned Aerial Vehicle (UAV)

Figure 2A:
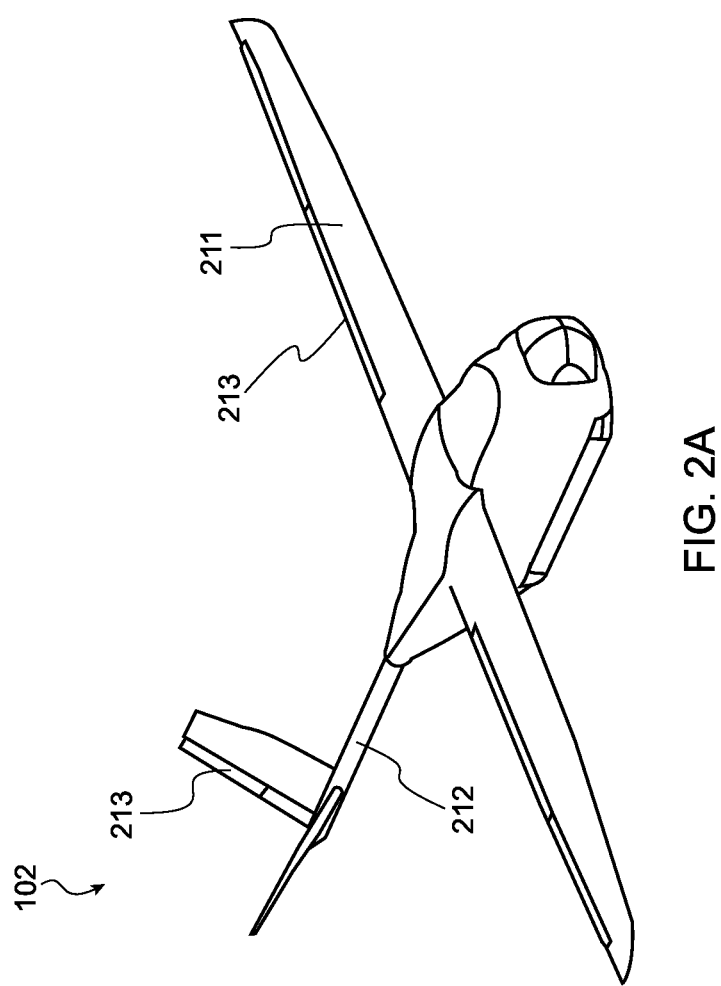
FIG. 2A is a diagram illustrating a top perspective view of an example design of a UAV, according to one embodiment.

The UAV 102 is an aircraft system with hardware and software modules that enable it to fulfill service requests with little or no human supervision. In one embodiment, the UAV 102 is comprised of an airframe that includes hardware and software modules that enable it to fly autonomously and complete a service request. FIG. 2A illustrates an upper perspective view of an example embodiment of a UAV 102. The embodiment illustrated comprises wings 211, tail 212, and control surfaces 213. The control surfaces 213 are coupled to and moved by actuators (not depicted in the figure). In one embodiment, the actuators are electrical servo motors. In another embodiment the actuators are pneumatic. The UAV 102 also has one or more engines, which are used for propulsion. The engines are not depicted in the illustration depicted in FIG. 2A, but they may be mounted on the wings 211, the nose of the aircraft, or the fuselage. The number and position of the engines can be varied based on the requirements of the aircraft. The engines may be jet engines, electric power propeller engines, gasoline-powered propeller engines, or any other type of engine that is suitable for use in light aircraft.

In the illustrated embodiment the UAV is a fixed-wing aircraft constructed of carbon fiber and plastic, with a V-tail comprising dual ruddervators. Alternative airframe configurations and materials may also be used for the UAV 102. For example, the UAV 102 may be a quadcopter, a fixed-wing aircraft with a conventional tail, a hybrid aircraft with both wings and vertical take-off rotors, etc. The materials used for the aircraft may be carbon fiber, titanium and aluminum alloys, plastic, or any other durable, lightweight material.

Figure 2B:
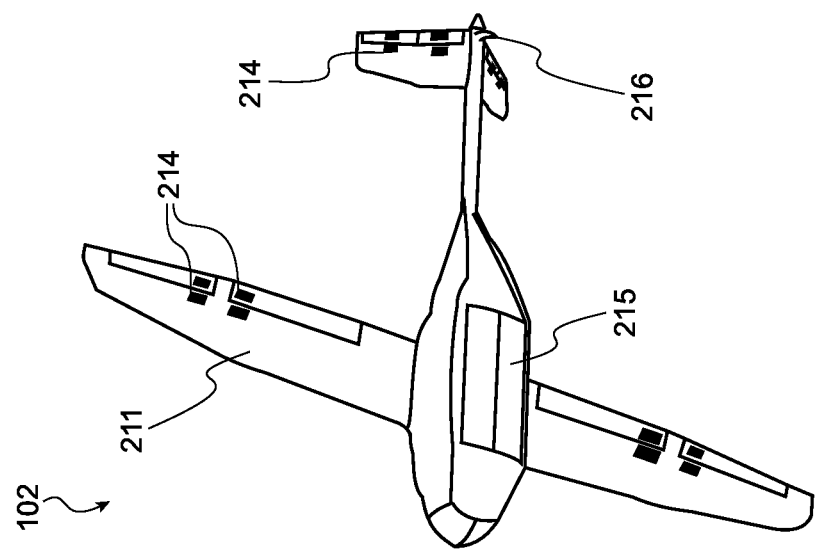
FIG. 2B is a diagram illustrating a bottom perspective view of an example design of a UAV, according to one embodiment.

FIG. 2B illustrates a lower perspective view of the same embodiment of the UAV 102. This view of the aircraft shows the calibration fiducials 214, the payload bay doors 215, and the tail hook 216. The calibration fiducials 214 are geometric patterns that enable a vision-based testing and calibration system to determine the position and movement of a control surface 213. The calibration fiducials and the testing and calibration system are used during pre-flight checks to ensure that the UAV 102's control surfaces 213 move in the expected manner when servos for those control surfaces are activated.

The payload bay doors 215 give access to an interior payload bay within the UAV 102. The payload bay can be used to carry packages for delivery, instruments for surveillance missions, communications equipment, etc. The payload bay doors 215 can be opened while the UAV 102 is in flight in order to airdrop a package at a destination site 105. The interior payload bay may include a mechanism that is used to expel a carried package from the payload bay. The mechanism used to expel the package from the payload bay may be a compressed spring, an elastic band, a servo motor, a hydraulic mechanism or any other device that can be used to forcefully expel the payload so that it can reliably clear the aircraft during a delivery.

In one embodiment, the UAV 102 carries its payload externally, attached directly to the aircraft fuselage, instead of in an internal payload bay. In the case of an externally carried payload, the aircraft fuselage will have attachment points for a payload, which may be actuated in order to release the payload.

Figure 2C:
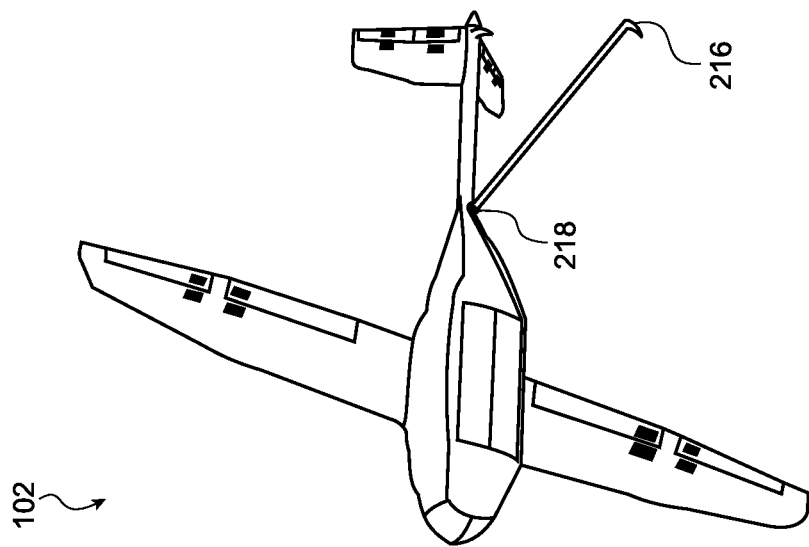
FIG. 2C is a diagram illustrating a bottom perspective view of an example design of a UAV with tail hook extension boom, according to one embodiment.
Figure 2C:
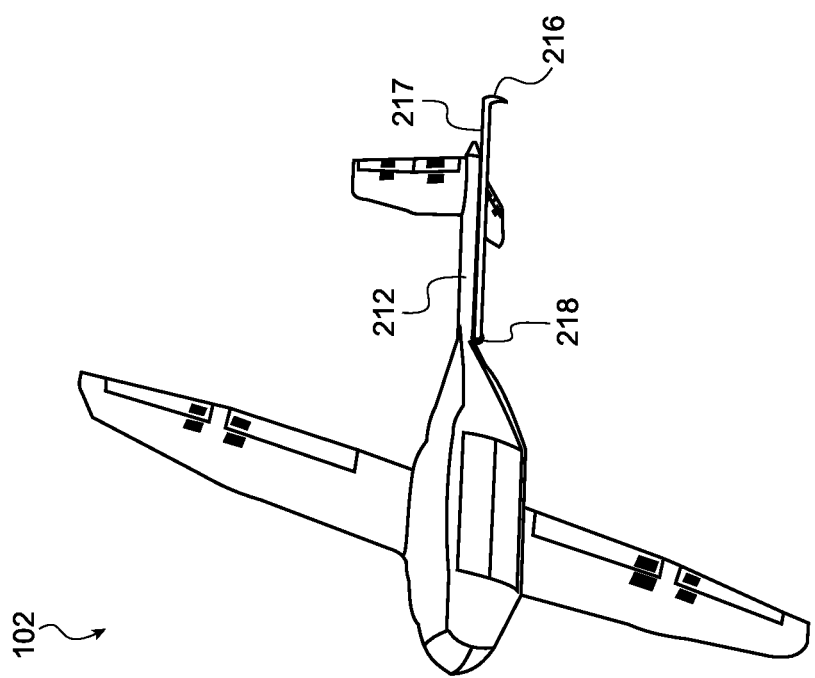

The tail hook 216 is a durable hook-like structure attached to the tail or fuselage of the UAV 102. The tail hook 216 assists in the recovery of the UAV 102. In the illustrated embodiment, the tail hook 216 is attached directly to the tail 212 of the UAV 102, but in an alternative embodiment, as shown in FIG. 2C, the tail hook 216 may be attached at the end of an extension boom 217, which extends beyond the end of the tail 212. The extension boom may be coupled to a boom hinge 218 which allows the tail hook 216 to be pivoted away from the tail 212, to allow for a separation between the main body of the UAV 102 and the tail hook 216. This separation can assist in the safe recovery of the UAV 102.

Figure 2D:
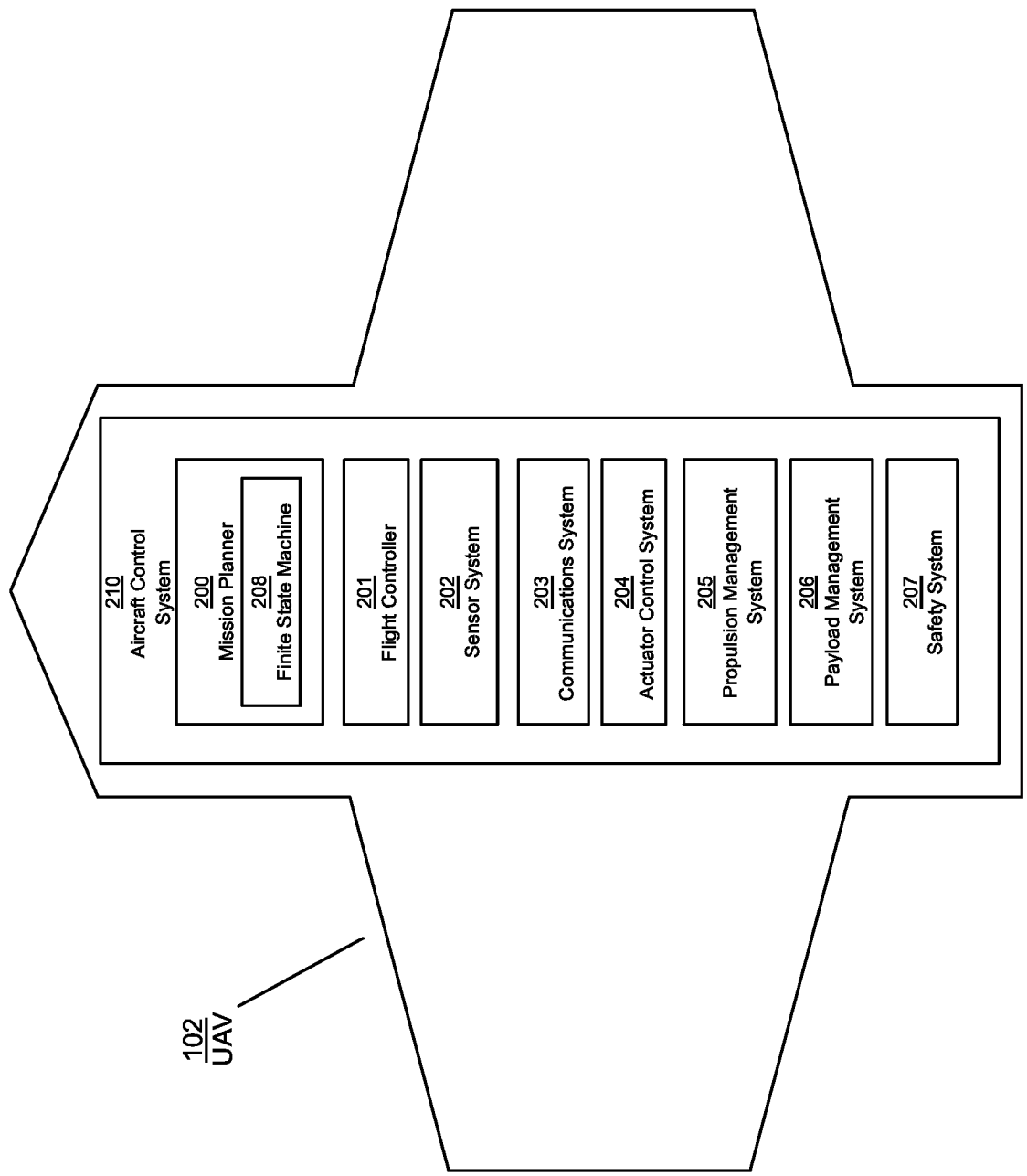
FIG. 2D is a system diagram illustrating the components of a UAV, according to one example embodiment.

FIG. 2D is a block diagram of the systems of a UAV 102 according to one example embodiment. The embodiment of the UAV 102 illustrated in FIG. 2D comprises a mission planner 200, a flight controller 201, a sensor system 202, a communications system 203, an actuator control system 204, a propulsion management system 205, a payload management system 206, and a safety system 207. Collectively, these modules together comprise an aircraft control system 210 for the UAV 102. In an embodiment of the UAV 102, two or more of the modules mentioned above may be combined into a single hardware component to reduce complexity, improve reliability, reduce weight, and/or reduce cost. For instance, in one example embodiment, the mission planner 200 and the flight controller 201 may be implemented using software modules that run on the same System On Chip (SOC) hardware.

Although not depicted in the figure, the modules of the UAV 102 are interconnected via at least one communications bus. The bus allows the modules to communicate with each other to receive and send information and commands. The bus may be implemented using any of the methods known to those with familiarity in aviation and vehicle engineering. For example, the bus may be implemented using the Controller Area Network (CAN) standard. To improve the reliability of the system, embodiments may use additional redundant buses. For example, a dual-CAN bus can be implemented to prevent a bus failure from causing the UAV to lose control.

The mission planner 200 is a module that provides the other modules of the UAV 102 with high-level directives and goals; the execution of these directives and goals causes the UAV 102 to fulfill a service request. The goals and directives produced by the mission planner 200 are communicated to the other modules of the UAV 102, which may then take other actions to complete a mission, including the generation of additional directives and goals for other modules of the system.

For instance, in one embodiment, the mission planner 200 determines a set of waypoints that the UAV 102 may traverse in order to reach a destination site 105, and provides the location of a first waypoint to the flight controller 201 as a goal, along with a directive to fly to that location. In this embodiment, the flight controller 201 may then, in turn, compute the orientation and propulsion needed to move the UAV 102 towards the goal location; the flight controller 201 may also generate further directives for other modules, such as, for example, for the actuator control system 204 and for the propulsion management system 205. The directives sent to the actuator control system 204 and the propulsion management system 205 may cause them to take actions that change the orientation of the UAV 102 and propel it towards the goal location. As a result of the actions taken by various modules in the UAV 102 in response to the directives and goals of the mission planner 200, the UAV 102 will fly to the designated first waypoint. Once that goal is achieved, the mission planner 200 may send new goals and directives to the other modules, such that the UAV 102 flies to a second waypoint, and a third waypoint, and so on, until the higher-level goal of reaching the destination site 105 is fulfilled.

Besides movement directives, the mission planner 200 may issue other directives to the modules of the UAV 102 that cause actions such as dropping of a payload, capturing of image data, transmitting of data, etc. The mission planner 200 may also receive commands from the global services 103, from human operators, or from third-party controllers (such as air traffic controllers), and may issue directives to the UAV 102 modules based on these commands. For instance, in one example embodiment, the mission planner 200, on board a UAV 102, may receive a command from a human operator to fly back to a distribution center 101 due to an approaching storm. In response to this command, the mission planner 200 will produce new goals and directives that are sent to other modules in the UAV 102, and as a result of these new goals and directives, the UAV 102 will change course and return to the distribution center 101.

In one embodiment, the mission planner 200 comprises a finite state machine 208. The finite state machine 208 is a data structure that organizes when and under what circumstances the mission planner 200 issues goals and directives to the other components of the UAV 102, during the course of the UAV 102's mission. Conceptually, the finite state machine 208 comprises a plurality of vehicle states and corresponding valid transitions between those states. At least one of the vehicle states is active at all times during the UAV 102's mission. The mission planner 200 broadcasts goals and directives, over the communications bus, to the other modules of the UAV 102, based on the current vehicle state. The finite state machine 208 transitions from one vehicle state to another vehicle state as the mission progresses, and when the finite state machine 208 enters a new vehicle state, the mission planner 200 may broadcast new goals and directives to the other modules of the UAV 102. For example, in one embodiment, the UAV 102 includes the vehicle states: launch, nominal flight, hold position, deliver package, return, and landing. In this embodiment, the mission planner 200 may begin the mission in the launch state. In the launch state the mission planner may give the flight controller 201 the goal of making the UAV 102 take off. Based on that goal, the flight controller 201 may increase the thrust provided by the engines and may lower the flaps on the wings by issuing directives to the actuator control system 204 and the propulsion management system 205. Once the vehicle is airborne, the finite state machine 208 may transition to the nominal flight state. In the nominal flight state, the mission planner 200 may send the flight controller 201 a directive to fly to a particular goal destination. Once the UAV 102 reaches the destination, the finite state machine 208 may transition to the deliver package state. Based on the deliver package state, the mission planner 200 may send directives to both the flight controller 201 and the payload management system 206, such that the destination site is safely approached, and the payload is released.

The finite state machine 208 may be represented using a variety of different data structures and can be implemented using a variety of hardware, software, or hybrid hardware-software methods. In one embodiment, the finite state machine 208 is implemented by creating a technical specification defining the vehicle states and valid state transitions, and then compiling the technical specification to produce an executable or object code that represent the defined states and transitions. In this embodiment, the executable or object code can be stored in a computer storage medium—such as random access memory, hard disc storage, flash memory—in the UAV 102. In another embodiment the technical specification may be translated into a hardware design that can be implemented using one or more hardware modules.

The mission planner 200 is provided with mission data prior to the launch of the UAV 102 from the distribution center 101. The mission data includes information that enables the mission planner 200 to locate the destination site 105, to determine an appropriate route to that location, and to perform any request-specific actions required to complete the service request. For example, in some embodiments, the mission planner 200 is provided with a destination location, a route to the destination location, and a series of points along the route where images are to be captured with an on-board camera.

In some embodiments, the mission data includes a local skymap for an area of operation. The area of operation is a geographic region that encompasses the distribution center 101 and the destination site 105. The local skymap is organized data that includes information that is useful in mission planning, including the locations of destination sites 105, flight corridors, and controlled zones. The local skymap may be stored in a custom data structure, or it may be stored using standard database software such as MYSQL, POSTGRESSQL, MONGODB, COUCHDB, etc. Database software that has the capability to organize and retrieve data based on geographic coordinates is especially suitable for storing the skymap.

A flight corridor is an area of airspace that is designated by the UAS 100 for UAV flight. The local conditions in a flight corridor may be monitored by the UAS 100, and the flight corridors may be used by the UAVs 102 to travel safely and efficiently between locations. The local skymap comprises information about each of a plurality of flight corridors. The information about each flight corridor may include, but is not limited to, data about the flight corridor's location, altitude, local wind conditions, local air traffic (i.e. other UAVs and aircraft within the flight corridor), precipitation, aerial hazards, geographic obstacles (e.g. Mountains), etc. Flight corridors may be subdivided in a way that allows them to safely accommodate several aircraft flying in separate lanes within a single flight corridor. For example, multiple aircraft may be accommodated in a single flight route by assigning each aircraft a distinct and exclusive lane in the corridor. In one embodiment, each flight corridor may be sliced horizontal into layers, with vertical separations between the layers, and each layer in the corridor may be reserved as a lane for a specific UAV 102 for the duration of its mission. For instance, a flight corridor may be sliced into three layers, one lane from 100 m Above Ground Level (AGL) to 110 m AGL, another lane from 110 m AGL to 120 m AGL, and a third lane from 120 m AGL to 130 m AGL. Aircraft may be assigned to these layers (lanes) such that, even if they cross paths in a flight corridor, as long as they stick to their assigned lanes, their altitude difference ensures that a collision will not occur. Prior to taking off from a distribution center 101, a UAV 102 may be provided with information that reserves it a slot in one or more flight corridors, which it can safely occupy for the duration of its mission. These reserved lanes in the flight corridors can provide a route for the UAV 102 from the distribution center 101 to the destination site 105.

A flight corridor may be represented in a skymap in a variety of different ways. In one embodiment a flight corridor is represented as a sequence of geographic coordinates with altitude, stored in a computer storage medium. For example, a flight corridor could be represented as a sequence of latitude, longitude, and altitude (i.e. three-dimensional) points. In this embodiment the sequence of points define a series of connected line segments that form a flight corridor. The latitude and longitude number may be given as GPS coordinates. Additional meta data can also be associated with the points or the line segments, to represent additional information about the flight corridors, such as, for example, local weather conditions. In another embodiment the flight corridors are represented as a sequence of three-dimensional curves (such as Bezier splines), where the curves are defined such that they pass through specific latitude, longitude, and altitude coordinates.

A controlled zone is a geographical area where aircraft may come into close proximity with other aircraft, and where, therefore, coordination between aircraft is needed to avoid collisions. The location of distribution centers 101 and destination sites 105 are typically controlled zones, since multiple UAVs 102 may attempt to approach these locations at the same time. Other locations may also be controlled zones; for example, a place where multiple flight corridors intersect may be a controlled zone. The mission planner 200 of a UAV 102 may take specific actions when approaching, entering, or leaving a controlled zone, in order to ensure that the UAV 102 maintains a safe distance from other aircraft. For example, the mission planner 200 may cause the finite state machine 208 to transition to a new vehicle state. Similarly, the mission planner 200 may cause the UAV 102 to change speed, altitude, and/or heading (either as a result of transitioning to a new vehicle state, or without a change of vehicle state).

Controlled zones may be represented in a variety of ways. In one embodiment, a controlled zone is represented by a latitude and longitude coordinate (a center point for the controlled zone) and a radius. In this embodiment the controlled zones are circular in shape. In another embodiment a controlled zone is represented by a polygon defined by a sequence of latitude and longitude points. For example, a controlled zone may be represented by three GPS coordinates that define a triangular zone, or a controlled zone may be represented by four GPS coordinates that define a rectangular zone. Controlled zones, like flight corridors, may also include altitude values to indicate the vertical bounds of the zone. For instance the latitude and longitude coordinates used to define a controlled zone, may also include an altitude coordinate.

In some embodiments, the local skymap is generated from a global skymap, which contains information about a wider geographic area, by selecting the information in the global skymap that pertains to the area of operation. If the global skymap is not excessively large, the entire skymap may be store on the UAV 102, instead of just the local subset pertaining to the area of operation.

Using the information in the skymap, the mission planner 200 develops a dynamic route from the distribution center 101 to the destination site 105, prior to launch or soon after launch. The dynamic route takes into account the goals of the mission as well as the requirement of the UAV 102 to return to a distribution center 101 after fulfilling the service request. In some embodiments, the mission planner 200 receives a pre-generated route from the distribution center 101 or the global services 103, and modifies that route only if it receives a command to do so, or if conditions in the area of operations change over time.

The dynamic route is a sequence of flight corridors that the UAV 102 may traverse to fly from its present location to some goal location. As the UAV 102 flies its mission, it may receive updates to the skymap from the UAS 100, including updates concerning local conditions of the flight corridors in the area of operation. The updates may be received from the global services 103, from the distribution centers 101, or from other UAVs 102. In some embodiments, updates may also be received from the service requestors 104, or from third-parties, such as weather information providers, news services, air traffic controllers, satellites, civil aviation authorities, law enforcement, military aviation authorities, etc.

The mission planner 200 may modify the dynamic route during the mission as the flight corridor updates are received. For example, in some embodiments, the mission planner 200 may alter the dynamic route to avoid flight hazards such as inclement weather, aircraft trespassing into a flight corridor, etc. When the dynamic route is modified, the mission planner 200 will re-determine the sequence of flight corridors that will be traversed to reach the goal location.

As illustrated in FIG. 2D, the UAV 102 also includes a flight controller 201. The flight controller 201 provides the mission planner 200 with guidance, navigation, and control functions. For example, the mission planner 200 is required to know the location, orientation, altitude, and speed of the UAV 102 at various times during the mission, and the flight controller 201 provides this information through a process called state estimation. Similarly, when the mission planner 200 requires the UAV 102 to move from one point to another, it sends commands to the flight controller 201 to achieve that goal. The flight controller 201 communicates over the bus with the sensor system 202, the actuator control system 204, and the propulsion management system 205, to provide the guidance, navigation, and control functions.

The sensor system 202 provides information from sensor instruments to the flight controller 201. In some embodiments, the sensor system 202 comprises several instruments, such as, for example, a GPS unit, an Inertial Measurement Unit (IMU), dynamic pressure sensor, static pressure sensor, air temperature reader, etc.

The actuator control system 204 includes actuators that control various movable parts on the UAV 102, including the control surfaces 213 on the airframe. The actuators may comprise of electrical servos, hydraulics, or any other technology that can be used to enable mechanical movement. The actuator control system 204 can change the state of the actuators based on commands from the flight controller 201.

The actuator control system 204 may also have a means of measurement (e.g. an encoder, resolver, or potentiometer) that can give feedback on the positions and movements of the control surfaces 213. The positions and movements of the control surfaces 213 may be reported back to the flight controller 201.

Since any moving mechanical system may develop small inaccuracies, defects, or "drift" as a result of the manufacturing process or as a result of use, the control surfaces 213, the actuators, and the means of measurement, must be periodically calibrated so that the real positions and motions of the control surfaces 213 correspond closely to the positions and motions that the actuator control system 204 receives from the means of measurement. The systems and methods used to perform this calibration are described in more detail in connection with FIG. 5.

The propulsion management system 205 controls the force exerted by the engines mounted on the UAV 102—for example by adjusting the speed of propellers mounted on a propeller powered UAV—and monitors the amount of battery capacity remaining on the UAV. The flight controller 201 can adjust the speed of travel of the UAV 102 by communicating with the propulsion management system 205. The propulsion management system 205 may also monitor the physical attributes of batteries onboard the UAV 102, such as changes in a battery's voltage over time, changes in the current output by a battery over time, and even changes in a battery's cell chemistry over the duration of a flight. The monitored information may be communicated to the distribution center 101 or global services 103, either during the mission via the communications system 203, or after the UAV 102 has returned to a distribution center 101. In the latter case the information may be communicated by wireless means, wired means, or by physical transfer of some storage medium such as a memory card.

The flight controller 201 receives information from the sensor management system 202 and the actuator control system 204, and performs a state estimation that provides a best guess of the UAV 102's position, orientation, and speed to the mission planner 200. The state estimation is continuously updated and checked as the various systems of the UAV 102 provide new information.

The mission planner 200 determines the high-level goal location that the UAV 102 must travel to and communicates the goal location to the flight controller 201. The mission planner 200 may communicate directives and goals to the flight controller 201 using any appropriate technique(s). For example, in one embodiment, the mission planner 200 communicates movement goals to the flight controller 201 via a sequence of waypoints. In another alternative embodiment, the mission planner 200 communicates movement goals to the flight controller 201 via splines.

The flight controller 201 receives the movement goals—as waypoints, splines, or any other suitable form—and determines, based on rules or physics-based models, the commands that must be communicated to the actuator control system 204 and the propulsion management system 205 to achieve the movement goals. For example, according to some embodiments, the physics-based models output the required ruddervator and wing flap state, and the engine thrust for the UAV 102, based on the current state estimation (i.e. the UAV 102's position, orientation, and speed), and the local conditions including wind and temperature.

The communication system 203 comprises transmitters and receivers that enable the UAV 102 to send and receive information using different communications protocols. The communication system 203 may include transmitters and receivers for standard cellular radio technologies such as CDMA, GSM, 3G/4G, LTE, etc., as well as line-of-sight radios that allow the UAV 102 to directly communicate with a distribution center 101 or another UAV 102.

The communications system 203 may also support mesh networking such that a first UAV 102 can receive and rebroadcast a signal sent by a second UAV 102, in order to increase the effective communications range of the second UAV 102. A third UAV 102 may similarly receive and rebroadcast the signal that was rebroadcast by the first UAV 102, increasing the communications range further still. This method of receiving and rebroadcasting signals for other UAVs may be implemented across the entire area of operations for the UAS 100 to enhance the connectivity of every UAV 102 operating in the system. A custom mesh protocol may be used to implement the mesh networking, or a standard mesh networking protocol such as IEEE 802.15.4, ZIGBEE, BATMAN, HWMP, IEEE 802.11 MESH, etc. In one embodiment of the system, only the line-of-sight radio is used to implement the mesh networking protocol.

The communications system 203 is used by the mission planner 200 to periodically broadcast status messages that contain information about the UAV 102's current status. The purpose of the broadcasted status messages is to inform the distribution centers 101, the global services 103, and other UAVs 102 about important information concerning the UAV. For example, a status message may contain information about a UAV 102's current position, current heading, current speed, current destination, etc. Other information, such as a UAV 102's payload, status of its batteries, and other similar information may also be broadcast. Some special information related to air traffic management may also be broadcasted in a status message, and this use of status messages is described in more detail below. A status message broadcasted by a UAV 102, may be rebroadcast by other UAVs 102 based on a mesh networking protocol, in order to increase the status message's effective range.

The payload management system 206 performs various functions related to the payload carried by the UAV 102, depending on the nature of the service request and the payload. For example, when the payload is attached to the UAV 102 prior to launch, the payload management system 206, will communicate that the attachment is successful to the mission planner 200 and/or the distribution center 101. In the case where the service request is a package delivery, the payload management system 206 also monitors the state of the payload—for example the temperature of the payload in the case where the payload is perishable—and manages the release of the payload at the destination site 105. In this example, the mission planner 200 determines the location, altitude, speed, and orientation of the UAV 102 required to drop the payload safely at the destination site 105, and communicates a command to release the payload at the appropriate time to the payload management system 206. The payload management system 206 receives the command and causes the payload bay doors 215 to open, dropping the payload.

The payload management system 206 may perform other functions depending on the nature of the payload. For example, in the case where the service request is related to surveillance or mapping, the payload management system 206 may interface with a camera system included in the payload and can capture images or video based on instructions received from the mission planner 200. For instance, in this embodiment, the mission planner 200 may issue a command to the payload management system 206 to capture images when the UAV 102 flies over some point of interest in its route.

The safety system 207 manages various failsafe components mounted on the UAV 102. For example, in one embodiment, the safety system 207 monitors and controls a parachute system that may be deployed based on a command received from the mission planner 200, or based on information received directly from the flight controller 201 or sensor system 202. For instance, if the UAV 102 enters a non-recoverable dive, the safety system 207 may deploy the parachute based on data received from the sensor system 202. In another embodiment, the mission planner 200 may instruct the safety system 207 to deploy a parachute based on a message received from the global services 103 or a distribution center 101. Parachute deployment on command may be useful in situations where an air traffic control process detects the possibility of imminent collision between multiple aircraft in an area with heavy air traffic. Forcing a UAV 102 to deploy its parachute and descend may prevent it from entering the flight path of other aircraft.

The mission planner 200 is designed to follow an air traffic management protocol to minimize the risk of collisions between UAVs 102 operating in the system. The air traffic management protocol defines actions that must be performed and messages that must be broadcast by UAVs 102 at specific times in a mission and/or under specific conditions.

The air traffic management protocol provides rules that the aircraft will follow as it traverses the skymap. The rules define specific messages that must be broadcast based on an aircraft's location and circumstances, as well as based on the location and circumstances of other aircraft. The rules also similarly specify actions that must be performed by an aircraft, based on its circumstances, the circumstances of other aircraft in the area, and based on the messages it receives from other aircraft. The rules specified by the air traffic management protocol are put into practice by the software/hardware systems and methods in the UAV 102, including the systems described above, such as the flight controller 201, the sensor system 202, and the communications system 203. The mission planner 200 is the hub where information about the UAV's circumstances is aggregated, including communications received, location in the skymap, flight information, etc. The mission planner 200 issues commands to the other modules and systems of the UAV 102, based on the aggregated information and the air traffic management protocol.

Although the UAV 102 is designed to operate autonomously, the mission planner 200 is configured to receive instructions via the communications system 203 that may override the mission planner 200's flight plans. For example, the UAV 102 may receive instructions from a distribution center 101 or the global services 103 that command the UAV 102 to return to base immediately due to bad weather or a passenger aircraft entering the area. On receiving such a command the mission planner 200 will change the movement goals of the UAV 102 and issue new directives to the other modules, so that the UAV 102 adjusts its flight path as necessary. The UAV 102 may continue to apply the air traffic management protocol to its flight along the adjusted route. The structure and functionality of the UAV 102 described above has been divided into modules based on one example implementation, but the functionality of various modules may be merged or further split such that there are more or less components than have been illustrated in FIG. 2D. It is also possible to devolve some of the functionality of the various modules directly into the servos, sensors, and other hardware components of the UAV 102. For instance, the flight controller 201 may communicate directly with a plurality of servo motors, each of which has the functionality of the described actuator control system 204. Such a decentralization of hardware component control may be beneficial in some implementations from the point of view of fault-tolerance.

Distribution Center

The distribution center 101 handles the local logistics for the UAS 100. When the global services 103 receive a service request from a service requestor 104, the global services 103 will select a distribution center 101 to fulfill the service request according to criteria in the service request, including the location of the destination site 105. The global services 103 will then send at least a portion of the information in the service request to the selected distribution center 101.

The distribution center 101 is responsible for launching and recovering UAVs 102, maintaining and monitoring inventories of payloads, equipment, batteries, and UAVs 102, and communicating local information to the global services 103. Other functions such as UAV, battery, and payload selection for missions, mission data preparation, UAV monitoring and communication during the mission, etc., can be performed by either the distribution centers 101 or the global services 103, depending on implementation and/or system status. A distribution center operator 107 may be stationed at the distribution center 101 to facilitate the distribution center operations.

Figure 3:
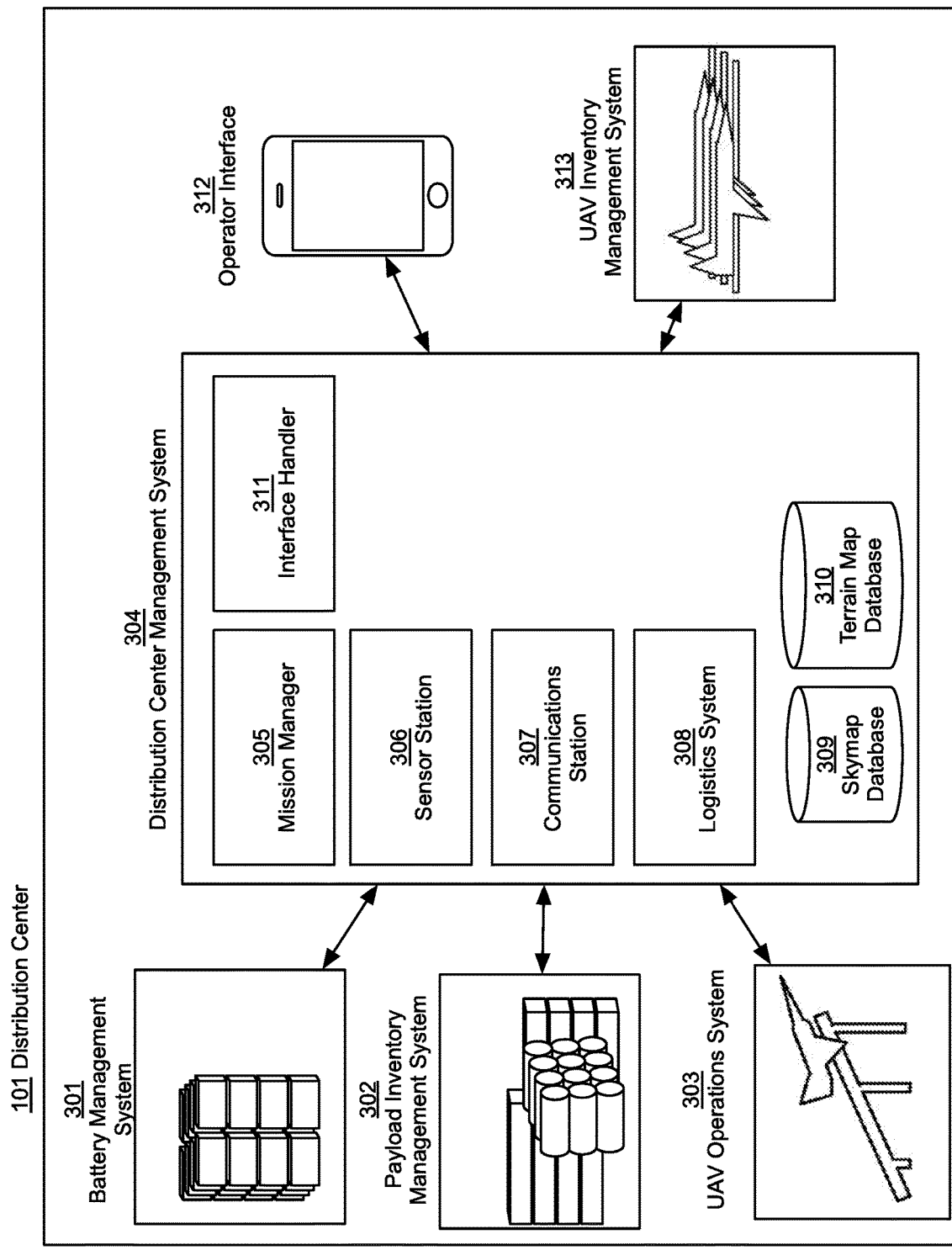
FIG. 3 is a diagram illustrating the components of a distribution center, according to one example embodiment.

FIG. 3 is a block diagram of a distribution center 101, according to one example embodiment. As mentioned previously, some of the functions performed by this embodiment of the distribution center 101 could be performed by the global services 103 instead. Similarly, some of the functions of the global services 103 could be performed locally by the distribution center 101. System designers with skill in the art may divide the functionality of the global services 103 and the distribution centers 101 in any appropriate way based on the requirements of a particular UAS implementation.

In this embodiment, the distribution center 101 is comprised of a battery management system 301, a payload inventory management system 302, a UAV operations system 303, a distribution center management system 304, an operator interface 312, and a UAV inventory management system 313.

The distribution center management system 304 serves as the hub of the distribution center 101. In this embodiment, the distribution center management system 304 comprises a mission manager 305, sensor station 306, communications station 307, logistics system 308, skymap database 309, terrain map database 310, and interface handler 311. In one example embodiment, the distribution center management system 304 is implemented using one or more computer servers that have specialized sensor and communications peripherals installed.

Some of the functions of the distribution center 101 may require the assistance of a human distribution center operator 107. For example, UAV assembly, UAV repair, payload attachment and detachment, UAV recovery, battery replacement, placing UAVs 102 on a UAV launcher, and placing batteries into charging equipment are tasks that may require human involvement if they are not fully automated. The operator interface 312 allows the distribution center operator 107 to receive information and instructions from the distribution center management system 304 and the global services 103, as well as to send information and instructions back to the distribution center management system 304 and the global services 103. The distribution center management system 304 communicates with the operator interface 312 via the interface handler 311. In some embodiments, the operator interface 312 is an application running on a smartphone, a tablet computer, or a personal computer, and the interface handler 311 communicates with the application via a wireless communications protocol, such as IEEE 802.11.

The mission manager 305 is a module that is responsible for managing the local aspects of mission operations at the distribution center 101. In some embodiments, the mission manager 305 receives service requests (or data derived from the service requests) from the global services 103, selects a UAV 102 or UAV components that will be assembled into a UAV 102, prepares the mission data that will be utilized by the UAV 102 during the mission, selects an appropriate payload for the mission, tests and launches the UAV 102, and monitors the status of the UAV 102 and payload during the mission. The mission manager 305 communicates with the distribution center operator 107 via the operator interface 312 during various stages of the mission to communicate both the status of the mission, as well as instructions indicating the actions to be taken to facilitate the preparation, loading, launch, and recovery of UAVs 102.

The mission manager 305 utilizes the other components of the distribution center management system 304 to monitor the status of the local environment and various local components of the UAS 100, including the UAVs 102, UAV operations system 303, battery management system 301, and the local inventories.

The mission manager 305 maintains contact with the global services 103 and local UAVs 102 through the communications station 307. Information about service requests is received from the global services 103, and information about local conditions, ongoing missions, inventories, etc., is transmitted back to the global services 103. The communications station 307 may have transmitters and receivers for several different standard telecommunications protocols, including, but not limited to GSM, CDMA, GSM, 3G/4G, LTE, etc. In addition to these standard protocols, the communications station 307 may also support line-of-sight or mesh protocols to enable direct communications with UAVs 102 and other distribution centers 101. Finally, the communications station 307 may also include a wired connection to the Internet for high-speed communication with the other components of the UAS 100 and third-party information providers. The mission manager 305 may send some of the information received via the communications station 307 to the operator interface 312, so that the distribution center operator 107 can monitor the status of UAVs 102 or other components of the UAS 100 that are relevant to a local mission.

The sensor station 306 is primarily used to gather local weather data for the distribution center 101's location. The sensor station 306 may include pressure sensors, thermometers, wind sensors, precipitation detectors, etc. The sensor station 306 may also be used to detect and track UAVs 102 using instruments such as radars, radio trackers, and optical object recognition systems. The mission manager 305 may present information from the sensor station 306 to the distribution center operator 107 via the operator interface 312, so that the distribution center operator 107 can take actions necessary to protect the UAVs 102 and distribution center 101 from inclement weather. For example, if the sensor station 306 detects an approaching storm, the mission manager 305 may display a notification to the distribution center operator 107 via the operator interface 312, and the operator 107 can follow procedures to recover UAVs 102 that have already been launched, to abort missions that have not been launched, and the like.

Prior to any vehicle mission being launched, the mission manager 305 determines the mission energy requirement for the mission based on mission information. Mission information may include information from the service request, information about the local conditions (such as temperature, wind, and precipitation), and information about the characteristics of the vehicle and payload. For example, in one embodiment, the energy requirement is determined by computer analysis of factors such as the location of the destination site 105, the route to the destination site 105, the wind conditions along the route to the destination site 105, the flight characteristics of the UAV 102 that will handle the mission (such as its typical power consumption per unit distance flown, aerodynamic drag, etc.), and the weight of the payload that is needed to fulfill the service request. The mission manager 305 communicates the mission energy requirement to the battery management system 301, which then selects one or more batteries that can provide sufficient power for the mission, from the battery inventory. The battery management system 301 may automatically install the selected batteries into the UAV 102 that will fly the mission, or it may use indicators to notify the distribution center operator 107 that specific batteries must be installed. Further details related to the operation of the battery management system 301 are discussed below.

The logistics system 308 tracks the inventory levels of various components at the distribution center 101, and reports these inventory levels to the global services 103 and the mission manager 305. This inventory information may be used when selecting a particular distribution center 101 to fulfill a service request.

The logistics system 308 interfaces with the battery management system 301, the payload inventory management system 302, and the UAV inventory management system 313 to determine the inventory levels of batteries, payloads, and UAVs/UAV components, respectively. The logistics system 308 is capable of requesting deliveries of additional stock when inventory levels fall below a threshold level or when inventory levels are predicted to fall below a threshold level within a specified period of time.

The global services 103 may monitor the inventory levels reported by the logistics system 308 and may proactively dispatch additional inventory items to a distribution center 101 based on current inventory levels or the predicted inventory levels in the future. The logistics system 308 may also directly notify the distribution center operator 107 of inventory shortages, or of errors with specific items in an inventory, via the operator interface 312. Based on these notifications, the distribution center operator 107 may restock or repair items as needed.

Each item at the distribution center 101 may be affixed with a tracking tag that can be monitored by the logistics system 308. Various technologies can be used to implement the tracking tags, including bar codes, RFID tags, NFC tags, etc. These tags may be affixed to every item at the distribution center 101 that requires tracking, including UAVs 102, UAV components, payloads, batteries, spare parts, etc. The tags associate an object identifier with each tracked physical object at the distribution center 101. For example, each payload at the distribution center 101 will have an object identifier associated with it that is indicated by the tag affixed to it. The object identifier may be read from the tag by way of a reader that is configured to scan the tag. For example, an RFID tag would be read using an RFID reader, an NFC tag using an NFC reader, etc.

The object identifiers can be used to determine the type of an object that has been scanned as well as its unique identity. For example, the tag affixed to a payload object will identify that the object is a payload of a specific type, as well as that it is a specific instance of that payload, different from other payloads of the same type in the inventory. In some embodiments, the object identifier can be used to determine a database entry associated with the object in an inventory database. The logistics system 308 reports the inventory levels for objects associated with each object identifier to the global services 103.

The illustrated embodiment of a distribution center 101 also includes a payload inventory management system 302 that tracks inventory levels and status for various payloads that may be mounted to the UAVs 102. The payload inventory management system 302 may also provide recharging, refrigeration, and other maintenance related functions related to specific payloads. For instance, if the payload is a vaccine, then the payload inventory management system may provide a refrigerated storage container for vaccine doses and may monitor and report the temperature in the storage container and the number of doses stored in the container to the logistics system 308. The mission manager 305 may notify the distribution center operator 107 of the status of various payloads stored at the distribution center 101 via the operator interface 312. For example, in some embodiments, the mission manager 305 may send a notification to the operator interface 312 to notify the distribution center operator 107 that a particular vaccine stored in the payload inventory management system 302 has expired. Based on this notification the distribution center operator 107 may remove the expired vaccine from storage and replace it with new stock.

The UAV inventory management system 313 tracks the assembled UAVs 102 and UAV components stored at the distribution center 101, and reports this information to the logistics system 308. The mission manager 305 or global services 103 may query the logistics system 308 to determine the UAV resources available for missions at a particular distribution center 101, and may allocate these resources based on the requirements of service requests received by the UAS 100. When a particular UAV configuration is required to fulfill a mission, the mission manager 305 may send instructions to the distribution center operator 107, via the operator interface 312, to assemble a particular set of UAV components—stored in the UAV inventory management system 313—to construct a UAV suitable to complete that mission. As UAVs or UAV components are added and removed from the inventory, the UAV inventory management system 313 tracks not only the availability of these resources, but also the status of components, such as their condition and need for replacement. This information may be used by the mission manager 305 and the global services 103 to order deliveries of new UAVs 102 or components for the distribution center 101.

The mission data that will be uploaded to the UAV 102 is prepared based on the requirements of the service request received from the global services 103. Although we discuss the preparation of the mission data by the mission manager 305, alternative embodiments are possible, where either the global services 103 or the mission planner 200 onboard the UAV 102, prepare the mission data. The mission data includes not only the location of the destination site 105 and the payload required to satisfy the service request, but also information required to generate a flight route to the destination location. The information required for route generation is stored locally in the skymap database 309 and the terrain map database 310.

The skymap database 309 contains data about a plurality of flight corridors in the geographic region served by the distribution center 101. The skymap database 309 may be at least partially synchronized with a global skymap database 400 that is part of the global services 103. The flight corridor data includes information about the real-time conditions within the flight corridors, such as weather, air traffic, etc. The local skymap database 309 updates the flight corridor data based on the latest information received from the global services 103, other distribution centers 101, and third parties (such as weather services and air traffic controllers). UAVs 102 that have recently flown in a flight corridor may also send data to the distribution center 101 about the last monitored conditions present in the flight corridor, and this information may be used by the skymap database 309 to update the relevant flight corridor data. When the local skymap database 309 at the distribution center 101 has more recent information about a flight corridor than the global skymap database 400, the global skymap database 400 is updated via the communications station 307. The reverse is also true, and the latest updates from the global skymap database 400 are received via the communications station 307 and incorporated into the local skymap database 309.

The terrain map database 310 contains terrain data, which is information about the terrain and ground obstacles in the geographic region served by the distribution center 101. This terrain data can be stored in a number of ways, including but not limited to, as raw images, as a heightmap, and as a three-dimensional (3D) mesh. The global services 103 also include a global terrain map database 401, which is at least partially synchronized with the local terrain map database 310. As in the case with the skymap databases, the terrain map database 310 is updated based on data captured from UAVs 102 during their mission flights. For example, if a UAV 102 flies over a location and captures information regarding a new obstacle that was not present at that location in the terrain map database 310, the terrain map database 310 will be updated with the new information via data received from the UAV 102, either during the mission, or after the UAV 102 has been returned to the distribution center 101.

Although the information about the flight corridors from the skymap database 309 may be sufficient to route the UAV 102 to the destination site 105, information about the ground that the UAV 102 is flying over can also be useful during various phases of the mission. For instance, during UAV launch and recovery, the terrain and obstacles near the launch and recovery sites are relevant. In addition, if the service request requires a package delivery, then the terrain and obstacles at the destination site 105 are relevant, as the UAV 102's mission planner 200 must determine a location from which to drop the payload such that the payload lands in an accessible place and does not damage local structures, objects, or persons.

The information from the terrain map database 310 is also useful for fulfilling service requests that require surveillance or mapping. In some instances, the terrain data from the terrain map database 310 can be used to fulfill a surveillance or mapping request without launching a UAV. For example, if a UAV 102 has recently captured imagery at a destination site 105 at a particular location, and a subsequent service request asks for image capture at the same location, within some threshold time limit, then the most recent information from the destination site 105 that has been stored in the terrain map database 310 can be sent to the service requestor 104.

To prepare the mission data locally, the mission manager 305 first determines the location of the destination site 105 from the service request information received from the global services 103. Based on this destination location, and the launch location, which is typically the location of the distribution center 101, the mission manager 305 determines the relevant area of operations for the mission, and extracts the data associated with this geographic region from the skymap database 309 and the terrain map database 310. The extracted information is sent to the UAV 102 as part of the mission data. In some embodiments, the mission manager 305 also provides the UAV 102 with a lowest cost route to the destination site 105 as part of the mission data. Depending on the implementation, the route can be dynamically updated by the global services 103, the mission planner 200 in the UAV 102, and/or the mission manager 305. When the connectivity to the UAV 102 cannot be guaranteed during the mission flight, the mission planner 200 onboard the UAV 102 may be allowed to dynamically update the route.

In some embodiments, the UAV 102 stores complete mirrors of the skymap database 309 and the terrain map database 310, instead of only subsets of the information in these databases. This can be done when the size of the databases is small enough that the storage resources on the UAV 102 are sufficient to store the entire dataset. When this is not the case, a subset of the information may be stored in the UAV 102, as described earlier. Similarly, in the case where the local skymap database 309 and local terrain map database 310 have sufficient storage capacity, the entire global skymap 400 and global terrain map 401 may be stored locally at the distribution center 101. Subsets of the global data may be extracted and stored locally only when the global data sets are too large for complete local mirroring to be economical.

The UAV operations system 303 is responsible for testing and calibration of the UAVs 102, launching of UAVs 102, and recovery of UAVs 102. The UAV operations system 303 may comprise three separate components: a testing and calibration system, a UAV launcher, and a UAV recovery system. However, it is possible to combine two or more of these components into a single integrated device to improve speed and efficiency. For example, the testing and calibration system may be combined with the UAV launcher so that the aircraft is verified and tested as it sits on the launcher.

The testing and calibration system tests the components of the UAVs 102 to ensure that they will perform during the mission. Faulty components are identified during testing and are brought to the attention of the distribution center operator 107 via the operator interface 312. The testing and calibration system also verifies, via the affixed tags, that each component in the assembled UAV 102 is a component allocated by the mission manager 305 for the current mission. For example, the testing and calibration system detects the battery and engines attached to the UAV 102, and ensures that they have adequate charge and performance for the mission, prior to launch. Discrepancies are brought to the attention of the distribution center operator 107 for correction. Similarly, the testing and calibration system verifies that the payload loaded onto the UAV 102 is the right payload for the current mission. Finally, the testing and calibration system also tests the control surfaces and other moveable components of the UAV 102, to ensure that these components respond in the expected manner to commands sent by the mission planner 200 and flight controller 201.

The testing and calibration system is described in more detail in connection with the description for FIG. 5.

The UAV launcher is an automated system that is used to launch the UAVs 102 in an efficient and reliable manner. The UAV launcher and the testing and calibration system may be combined into a single device.

The UAV recovery system is an automated system that is used to recover the UAVs 102 in a manner that minimizes the wear and tear on the fuselage of the UAVs, while also minimizing the risk to human operators in the vicinity.

The UAV operations system 303 is designed to allow the distribution center operator 107 to launch and recover many aircraft reliably, within a short period of time.

Once the UAV 102 is launched, and the mission manager 305 continues to monitor the aircraft during the mission flight. The mission manager 305 receives status updates from the UAV 102, and these status updates enable the mission manager 305 to track the progress of the mission at least intermittently. The mission manager 305 may present information related to the UAV 102's status to the distribution center operator 107 via the operator interface 312. In the event that there is some local event that requires a mission termination, such as, for example, an approaching storm, either the mission manager 305 or the distribution center operator 107 (or both), via the operator interface 312, can send a command to the UAV 102, through the communications station 307, to instruct the UAV 102 to return to the distribution center 101.

Global Services

The global services 103 are a collection of software services running on one or more computer servers, accessible through the Internet or another communications protocol. In one example embodiment, the global services 103 are software modules running on virtual machines in a third-party data center, such as Amazon Web Services or Google Cloud.

One purpose of the global services 103 is to provide a global infrastructure to coordinate, support, and manage multiple distribution centers 101, service requestors 104, and UAVs 102. However, in some embodiments, it is conceivable that the functionality of the global services 103 is provided by a local computer server, and that the server serves a local set of UAVs 102, distribution centers 101, and service requestors 104—possibly only a single one of each.

One or more global system operators 106 and remote vehicle operators 108 connect to the global services 103 and provide human intervention for systems that cannot be fully automated (or require temporary human assistance). The global system operators 106 and remote vehicle operators 108 typically connect to the global services 103 through control devices. A control device may be a computer workstation, a personal computer, a tablet device, a smartphone, or any other computing device that can communicate through a network with the global services 103. For instance, in one example embodiment, a global system operator 106 uses a laptop computer, with an Internet connection, to connect to the global services 103 executing on a computer server, which is also connected to the Internet.

Figure 4:
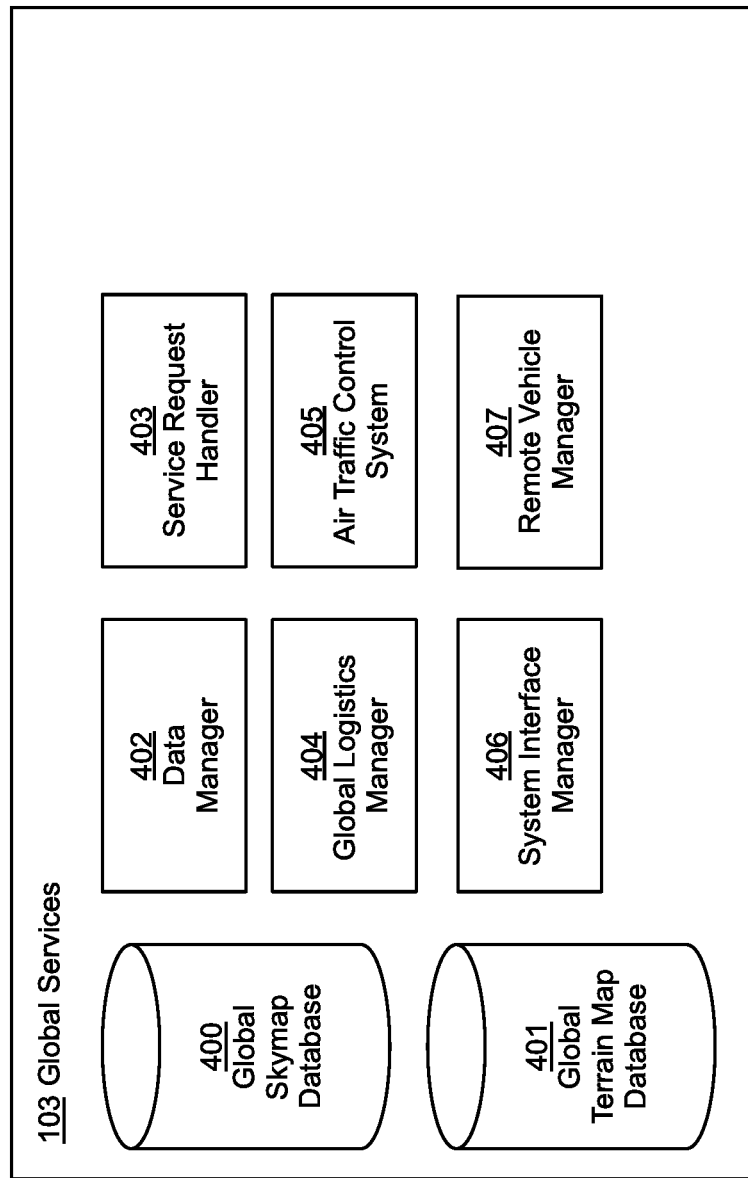
FIG. 4 is a diagram illustrating the components of the global services, according to one example embodiment.

In the example embodiment illustrated in FIG. 4, the global services 103 are configured to serve a plurality of distribution centers 101, UAVs 102, and service requestors 104. In this embodiment, the global services 103 comprise a global skymap database 400, a global terrain map database 401, a data manager 402, a service request handler 403, a global logistics manager 404, an air traffic control system 405, a system interface manager 406, and a remote vehicle manager 407.

As discussed earlier, the global skymap database 400 and the global terrain map database 401 are global repositories for skymap and terrain map data in the UAS 100. As was the case with the local versions of these databases, the information in these databases can be represented in various ways depending on the needs of the UAS 100. Although these databases are represented as single units in the illustrated embodiment, in practice the databases may be implemented using several mirrored data stores to provide improved read speed, redundancy, and error recovery.

The data manager 402 manages data-writes into, and data-reads out of the global databases. For example, as updates to the local skymap databases 309 and local terrain map databases 310 are communicated to the global services 103, the data manager 402 ensures that the information is stored in the appropriate database and that the latest information is always available and is not overwritten by out-of-date information. The data manager 402 also manages information received from outside of the UAS 100 and integrates this information into the global databases. For instance, information received from third-party weather information providers, aviation authorities, and external air traffic controllers may be integrated into the global skymap database 400. Similarly, third-party topographical data, map imagery, and surveillance data may be integrated into the global terrain map database.

The data manager 402 also manages the updates sent to the local databases at each distribution center 101. In one embodiment, as the global skymap database 400 and global terrain map database 401 are updated, the data manager 402 will monitor the regions where those updates are relevant, and will send at least a portion of those updates to distribution centers 101 that are in the relevant regions. In another embodiment, the mission manager 305 at a distribution center 101 in a particular region will periodically request information about that region from the global services 103, and the data manager 402 will determine the set of information that is relevant to that region from the global databases, and will send that information to the distribution center 101, where the information may be integrated into the local databases. Similarly, a UAV 102 in flight may request information about its current location from the global services 103, and the data manager 402 may similarly determine the relevant information that should be sent back to the UAV 102 based on the UAV 102's location.

The service request handler 403 manages service requests sent by service requestors 104 that are received by the global services 103. When a service request is received by the global services 103, the service request handler 403 will communicate with the global logistics manager 404 to determine a distribution center 101 that is suitable for handling the service request locally. As mentioned previously, the selection of the distribution center 101 may take into account not only the location of a destination site 105 specified in the service request, but also the logistic requirements of the request, such as payload, UAV capability, etc. For instance, a service request may include information that specifies a payload type required to complete the request, and the distribution center 101 may be selected based on the availability of that payload type at various distribution centers 101.

The payload type may be specified directly by means of a payload identifier associated with a type of payload, or it may be specified by implication. For example, a camera payload may be specified by implication if the service request is a request for image data at the destination site 105.

In some embodiments, the service request handler 403 takes input from a global system operator 106 to determine the distribution center 101 that will be used to fulfill a service request.

Once the distribution center 101 and UAV 102 have been identified and reserved to fulfill a service request, the service request handler 403 may notify the service requestor 104 that the service request is in process. The service request handler 403 may also receive information from the distribution center 101 and/or the UAV 102 that allows a predicted time of mission completion to be estimated and sent to the service requestor 104.

The service request handler 403 is capable of communicating with the service requestor 104 via the system interface manager 406. A human service requestor 104 will typically send a service request to the global services 103 by means of some remote client device such as a mobile phone, a tablet, or a personal computer. The system interface manager 406 is capable of sending information to the client device operated by the service requestor 104 that is configured to be displayed on the client device. For example, in one embodiment, the system interface manager 406 functions as a web server, and the client device connects to the web server and displays a web page that is downloaded from the system interface manager 406. In this example, the service requestor 104 can receive and send information to the global services 103 via the displayed web page. In another embodiment, the system interface manager 406 exposes an application interface over the Internet (such as a representational state transfer, or "REST" interface), and an application running on the client device is configured to display information received from the global services 103 to the service requestor 104, and to send information inputted by the service requestor 104 back to the global services 103.

The service request handler 403 may also play an active part in determining the route a UAV 102 takes on a mission to complete a service request. For example, the service request handler 403 may use the system interface manager 406 to query a service requestor 104 for the precise location of the destination site 105, and the information provided by the service requestor 104 may be used to refine the flight route used by the UAV 102 in fulfilling the service request.

The structure and functionality of the global services 103, described above, has been divided into modules based on one example implementation, but the functionality of various modules may be merged or further split such that there are more or fewer components than have been illustrated in FIG. 4. For example, it is possible to merge the skymap and terrain map databases into a single data store. Some of the services illustrated can be moved outside the UAS 100, for example, the air traffic control system 405 and the global logistics manager 404 may be operated outside the UAS 100 as independent services, accessible through an Application Programming Interface (API). These and other changes to the structure do not change the overall architecture of the system, and systems with such changes may operate in the same or similar manner as the system disclosed.

The service request handler 403 utilizes the global logistics manager 404 to obtain information required for distribution center 101 and UAV 102 selection. The global logistics manager 404 tracks the inventory information in each local logistics system 308 at each distribution center 101. The global logistics manager 404 may proactively route additional stock to local distribution centers 101 when supplies of any inventory item are depleted, are below some threshold quantity, or are predicted to be depleted within some threshold time. The global logistics manager 404 may also notify a global system operator 106 in the event of an inventory shortage at a distribution center 101. The global system operator 106 may take actions outside the UAS 100 to route new inventory items to the distribution center 101, such as, for example, ordering and shipping items from a third-party warehouse.

In one embodiment, the global logistics manager 404 relocates UAVs 102 from a first distribution center 101 that has an excess of UAVs to a second distribution center 101 that has a shortage of UAVs. In this embodiment, the global logistics manager 404 may monitor the daily, monthly, or yearly patterns of service requests to determine the estimated UAV requirements at each distribution center 101 over a period of time. Based on these estimated UAV requirements, the global logistics manager 404 may preemptively relocate UAVs from one distribution center 101 to another. The relocation of UAVs 102 may be done using third-party shippers, or the relocation may be done by sending requests to the distribution centers 101 to launch UAVs 102 with destination sites 105 set to other distribution centers 101. As an optimization, these relocation flights may be scheduled during times when the service request volume is low, for example, late at night or during holidays.

The air traffic control system 405 is responsible for tracking the UAVs 102 and aircraft that are known to be in flight in the area served by the UAS 100. The air traffic control system 405 receives information from the distribution centers 101, the UAVs 102 in flight, and from third party air traffic information providers. The information received by the air traffic control system 405 includes the known positions of aircraft in the area of the UAS 100, as well as flight routes that are registered with the system. Distribution centers 101 and/or UAVs 102 may register flight routes for missions, with the air traffic control system 405. The air traffic control system 405 may also allow UAVs and aircraft operated by third parties to register their flight routes.

The air traffic control system 405 provides real-time information updates regarding the positions of aircraft and UAVs to UAVs 102 that are flying missions. Using this information, the mission planners 200 onboard the UAVs 102 may modify their flight routes to avoid colliding with other aircraft. The air traffic control system 405 may offer similar information updates to UAVs and other aircraft that are operating outside the UAS 100 in order to maintain a safer airspace for all aircraft operations.

The air traffic control system 405 also provides information to the service request handler 403 and the global logistics manager 404. Information from the air traffic control system 405 may be used to influence the selection of distribution centers 101 for service requests and the relocation of UAVs 102. For example, a service request may be routed away from distribution centers 101 where there is an excess of air traffic in the vicinity, and UAV relocation may be timed to avoid periods when air traffic is at its highest.

The remote vehicle manager 407 provides autonomous vehicles, such as the UAVs 102, with a human operator on demand. In the course of a mission, a UAV 102 may encounter a situation that its mission planner 200 or flight controller 201 cannot understand or safely handle. For example, an autonomous vehicle in an urban environment may not have the necessary routing and vision systems to handle path-determination and object avoidance in such a complex setting. Thus, an autonomous vehicle, such as a UAV 102, may fly under the control of its onboard mission planner 200 and flight controller 201 while in a relatively simple and uncluttered environment outside a city, but may then request human assistance once a city is entered.

Testing and Calibration System

The testing and calibration system is an automated system that performs several verification functions prior to the launch of the UAV 102. The testing and calibration system calibrates the movable parts of the UAV 102 to ensure that the parts move as expected when commanded by the modules of the UAV 102 (such as the actuator control system 204, flight controller 201, etc.). The testing and calibration system also verifies that the UAV 102 comprises the expected components that are necessary for the mission, including the correct payload. Finally, the testing and calibration system may test the engines and other components to detect failures and defects, and to predict future failures and defects where possible.

Figure 5A:
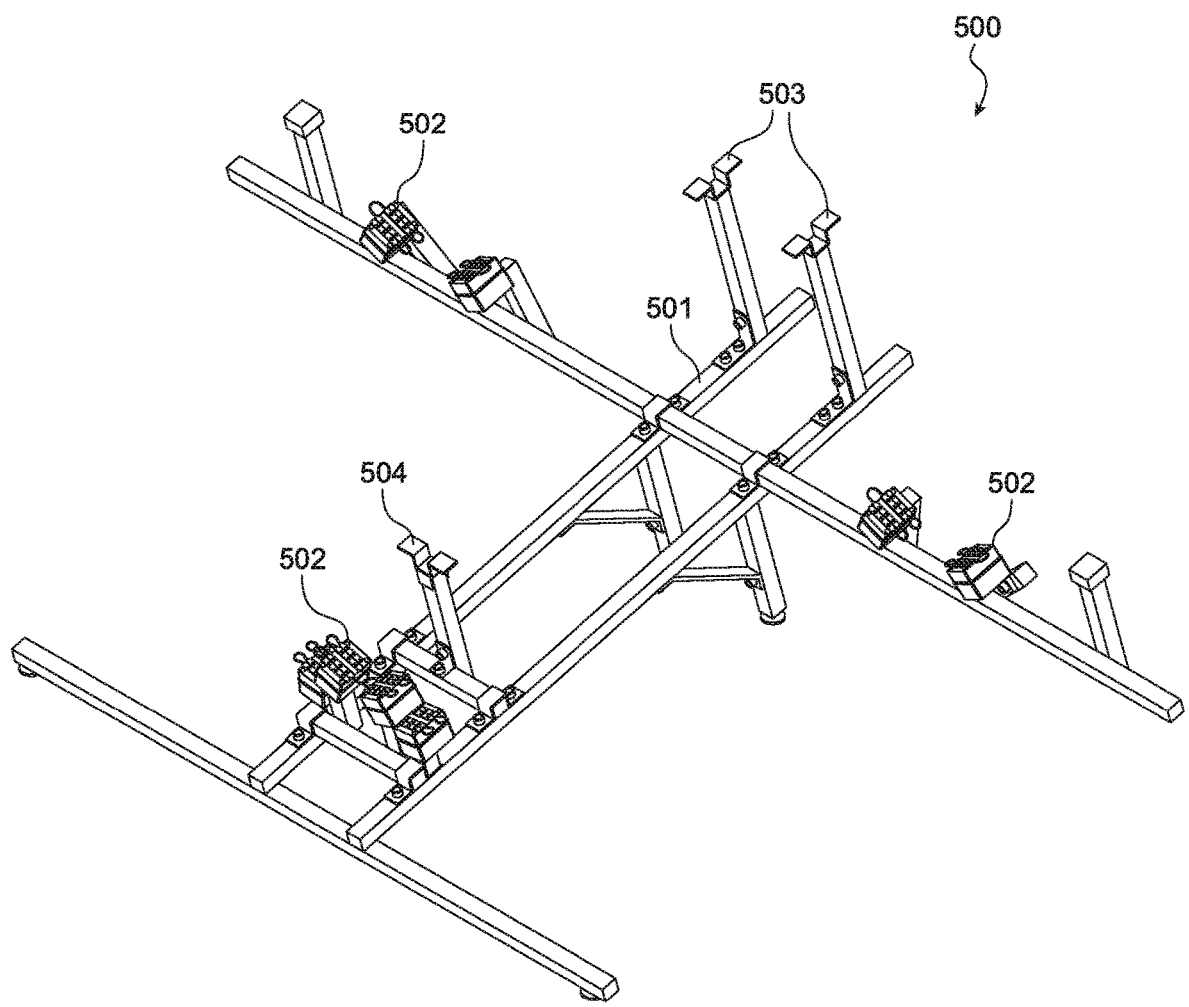
FIG. 5A is a diagram illustrating an example testing and calibration system, in a top view according to one embodiment.

FIG. 5A illustrates an embodiment of a testing and calibration system 500. In the illustrated embodiment the testing and calibration system 500 comprises a support stand 501, several cameras 502, fuselage support struts 503, and tail support strut 504.

Figure 5B:
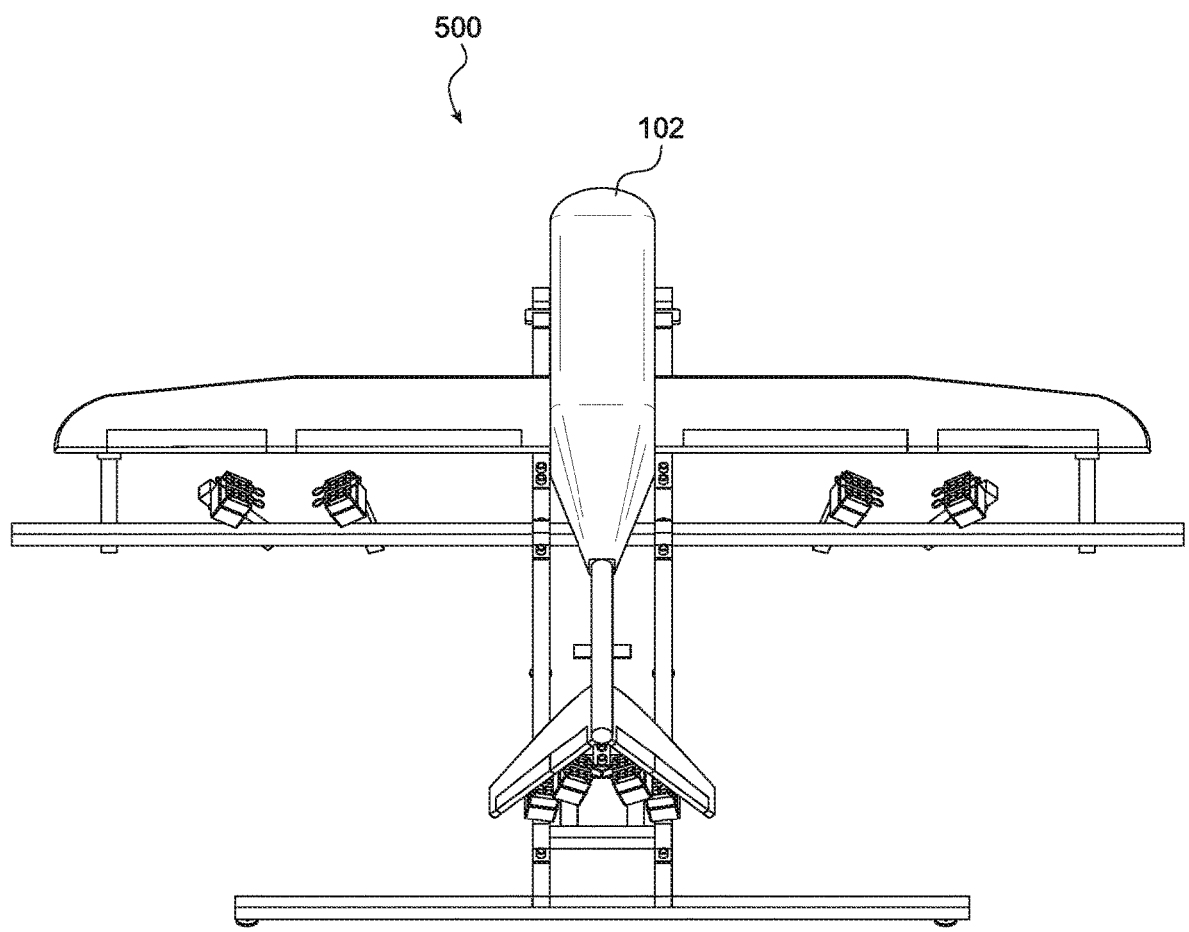
FIG. 5B is a diagram illustrating an example testing and calibration system, in a top view, with a UAV placed upon it, according to one embodiment.
Figure 5C:
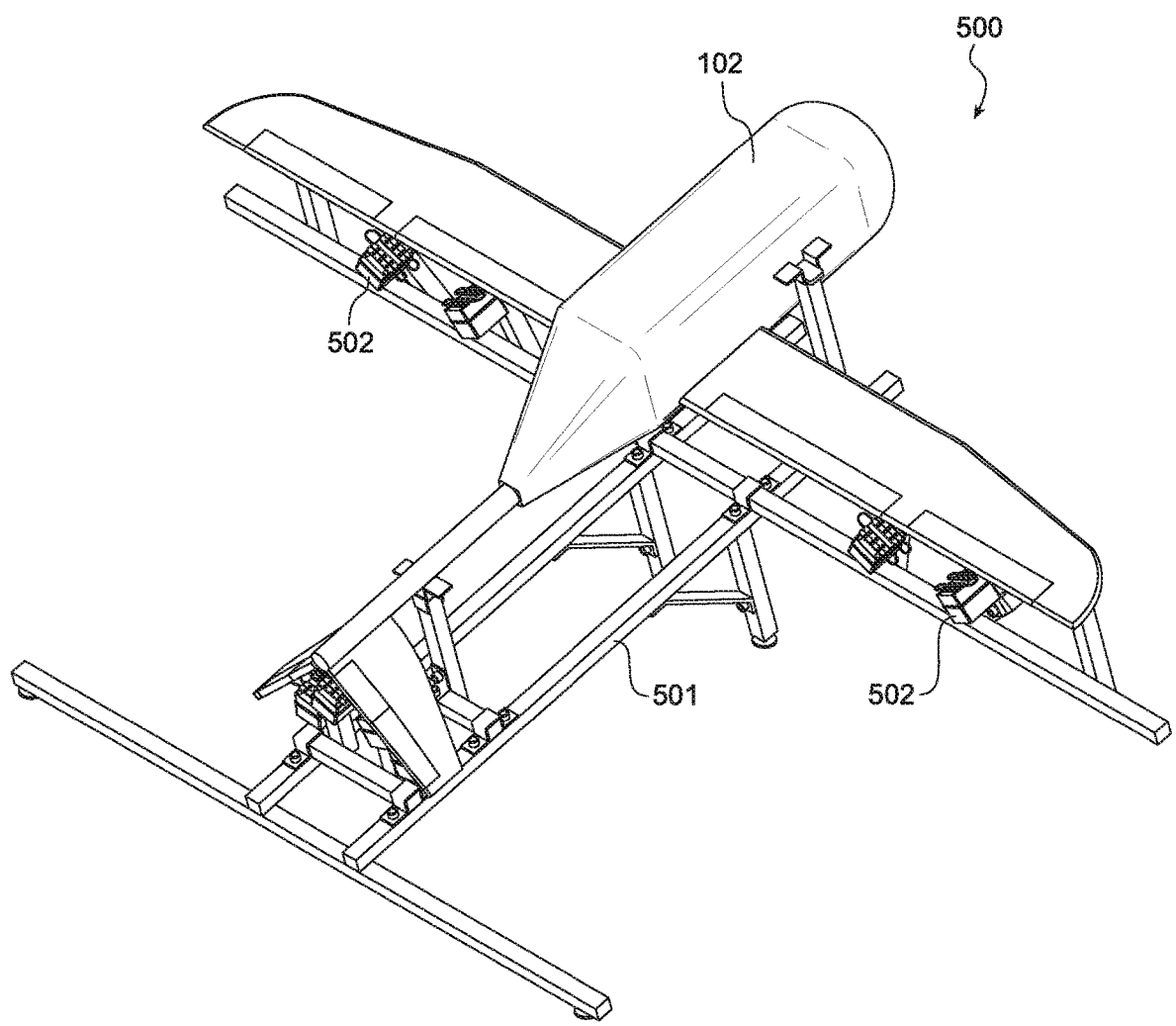
FIG. 5C is a diagram illustrating an example testing and calibration system, with a UAV placed upon it, in a side view, according to one embodiment.

FIG. 5B illustrates the same embodiment of the testing and calibration system 500 with a UAV 102 placed upon it for testing. FIG. 5C illustrates a side view of an embodiment of the testing and calibration system 500, with a UAV 102 placed upon it.

The support stand 501 is a frame of durable material that acts as a support upon which the other components of the testing and calibration system 500 can be mounted. The support stand 501 ensures that the other components of the testing and calibration system 500 maintain a fixed position relative to each other and the UAV 102 after many duty cycles. As described below, the testing and calibration system 500 may use a vision-based system for various testing and calibration tasks, and for these tasks it is helpful that the UAV 102 and the cameras be in a predictable position relative to each other.

The fuselage support struts 503 and the tail support strut 504 provide direct support for the UAV 102 when it is placed on the testing and calibration system 500. In the illustrated embodiment the UAV 102 is placed upon the support stand 501 in an inverted position, so that the control surfaces 213 of the UAV 102 are close to the cameras 502 of the testing and calibration system 500. In an alternative embodiment the support stand and support struts may be arranged in a different physical configuration to accommodate a UAV with different physical dimensions. The struts 503 and 504 ensure that the UAV 102 rests in a stable, predictable, and repeatable manner when placed on the testing and calibration system 500. The struts 503 and 504 are positioned such that each calibration fiducial 214 on the UAV 102 is positioned within the field of view of at least one of the cameras 502, when the UAV 102 is placed on the testing and calibration system 500.

Figure 5D:
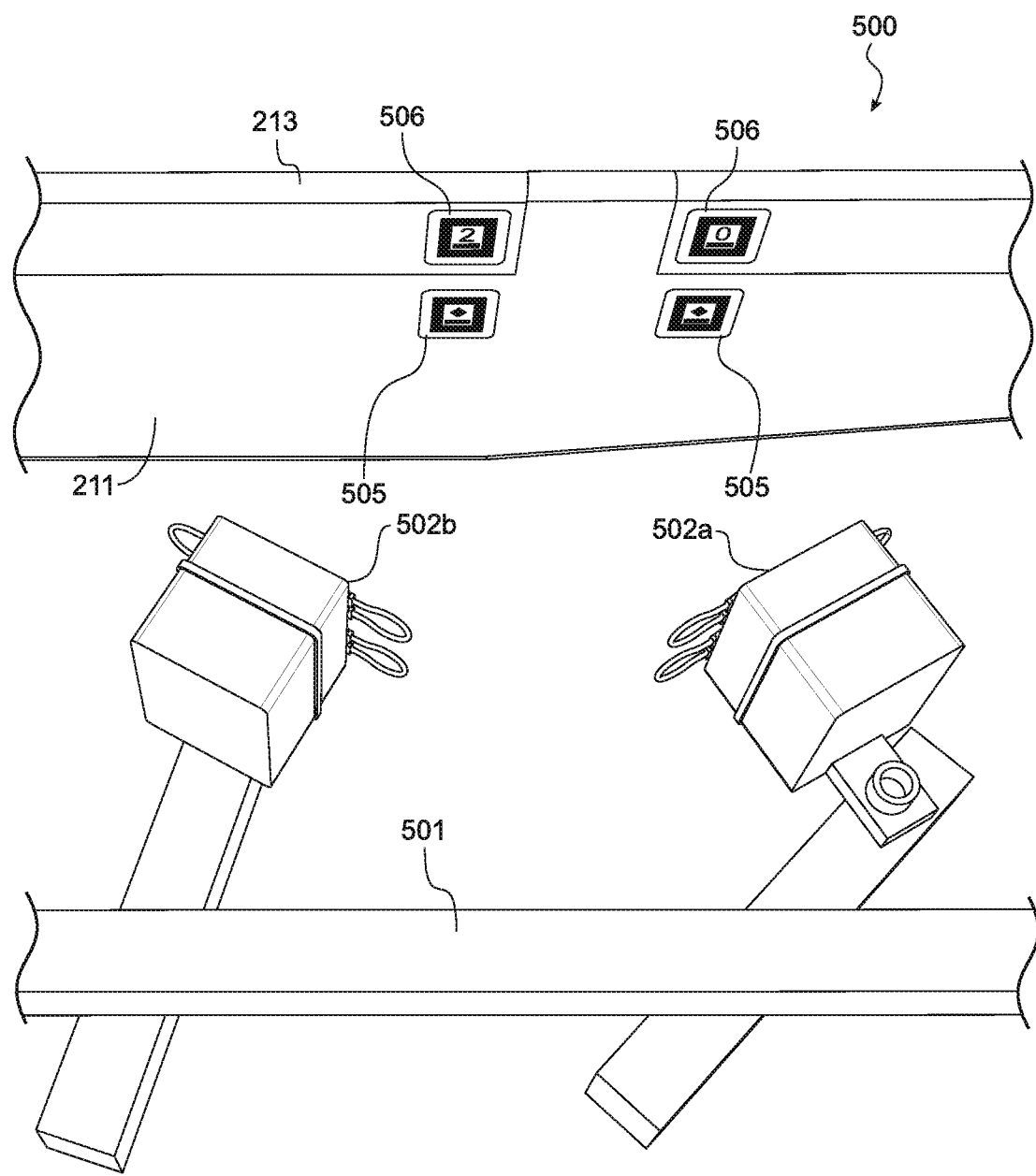
FIG. 5D is a diagram illustrating an example testing and calibration system, showing a camera, base fiducial, and movable fiducial, according to one embodiment.
Figure 5E:
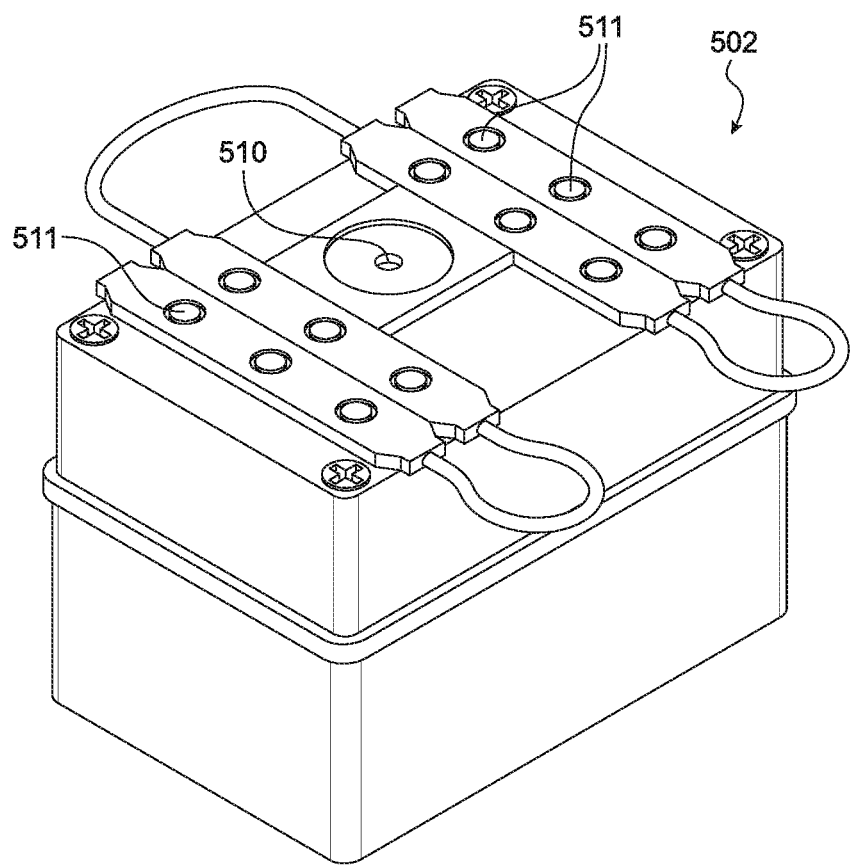
FIG. 5E is a diagram illustrating a close up view of an example camera, according to one embodiment.

The cameras 502 are digital imaging sensors that can be used to capture digital images of the calibration fiducials 214 of the UAV 102. FIG. 5D illustrates a view of a wing 211 of the UAV 102 positioned over the support stand 501 with attached cameras 502a and 502b. FIG. 5E shows a close up view of a camera 502, showing a lens opening 510 and lights 511. Although the lights are shown attached to the camera body, in another embodiment, the lights may be mounted separately from the camera 502.

Calibration fiducials 214 are of two types. The movable fiducials 506 are placed on the movable parts of the UAV 102, such as the control surfaces 213, payload bay doors, etc. The base fiducials 505 are placed close to the movable fiducials 506, on a proximate part of the UAV 102 that does not move. For example, in the illustrated embodiment the base fiducials 506 are placed on the wing 211, proximate to where the movable fiducials 506 are affixed to the control surfaces 213.

Each base fiducial 505 is paired with a corresponding movable fiducial 506, and vice versa, and the cameras 502 are placed such that each pair of calibration fiducials is within the field of view of a camera 502.

The purpose of the fiducials is to present a distinct pattern that can be easily identified in a digital image by a computer algorithm. In the illustrated example, the fiducials are distinct black and white patterns, which may be affixed to the UAV 102 as a decal or sticker (or any other visible paint, ink, pattern, texture, or the like). In the illustrated example, the pattern is an outer black square (the outer fiducial pattern) with a hollow interior containing additional symbols (the inner fiducial pattern). The black square (or any four-sided polygon or other appropriate shape) is used to determine the position of the fiducial, while the interior symbols help to uniquely identify the fiducial and give its orientation.

Alternative embodiments may also be used as fiducials. For example, in one embodiment the fiducials may be distinct color patterns on the UAV 102, such as a sticker, paint, ink, texture, or decal. In another embodiment, the fiducials are a distinct pattern of small lights built directly into the UAV 102 or affixed to the UAV 102 as part of a separate assembly. In yet another approach a distinctive pattern of small circles is used on each surface.

The testing and calibration system 500 may have additional components that are not illustrated in the figures. Additional components may include a testing and calibration computer for performing calculations necessary for the testing and calibration process, RFID sensors for detecting RFID tags that are affixed to the UAV 102, lights for providing uniform lighting of the fiducials, and a WIFI or ETHERNET module for communicating with other components of the UAS such as the UAV 102 and distribution management system 304. The testing and calibration computer may be a separate computer server, a laptop computer, a PC, a handheld computer, an embedded computer that is integrated into the testing and calibration system 500, or a software module that is part of the distribution center management system 304.

Figure 5F:
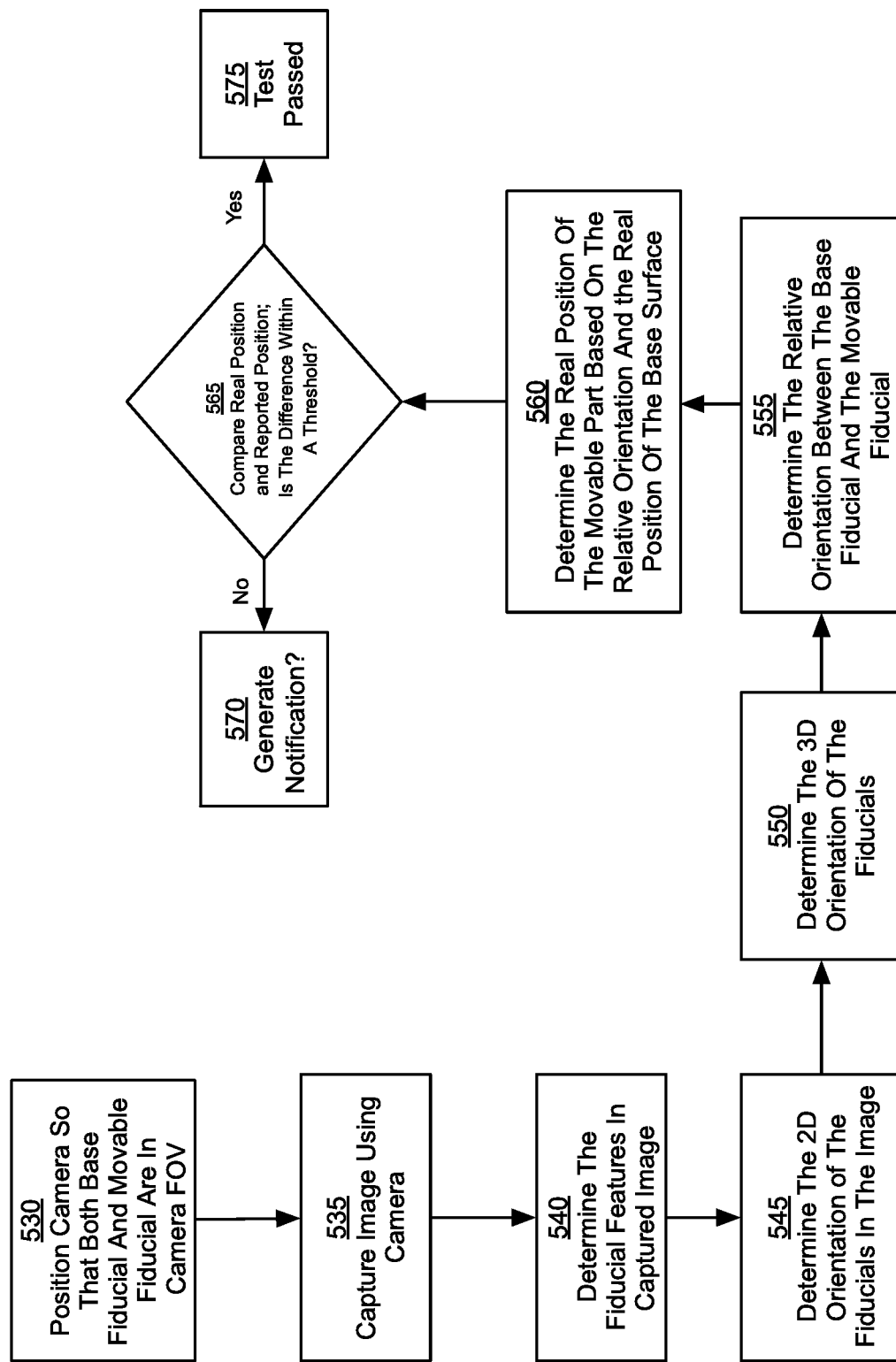
FIG. 5F is a diagram illustrating an example process for testing and calibration using a camera-based system, according to one embodiment.

FIG. 5F illustrates one embodiment of a process used by the testing and calibration system 500 to test and calibrate a movable part of the UAV 102 (such as a control surface). All the movable parts of the UAV 102 that require testing and calibration are prepared by affixing a fiducial (movable fiducial) to the part of the UAV that moves, and another fiducial (base fiducial) to an adjacent surface of the UAV that does not move. These fiducials are typically applied to the UAV 102 as part of the manufacturing process. Once applied to a UAV 102, a fiducial will remain on the aircraft for a relatively long period of time, requiring replacement only if the features of the fiducial are damaged or otherwise worn off.

The fiducials on the UAV 102 and the cameras of the testing and calibration system 500 are used together to test and calibrate the movable parts of the UAV. Existing augmented reality systems have used fiducials to aid in placing virtual objects in live video streams (see, e.g., *Marker Tracking and HMD Calibration for a Video-based Augmented Reality Conferencing System*, Hirokazu Kato and Mark Billinghurst, Faculty of Information Sciences, Hiroshima City University2Human Interface Technology Laboratory, University of Washington, which is hereby incorporated by reference), however the testing and calibration system 500 uses similar techniques to determine the orientation of control surfaces.

The first step of the process is to place the UAV 102 on the testing and calibration system 500. This positions 530 at least one of the cameras 502 such that the movable fiducial 506 and base fiducial 505 are in the camera's field of view. The relative positions of the camera 502 and the base fiducial 505 should be either acquired or computed by the testing and calibration system 500; or alternatively, the base fiducial and movable fiducial's relative position should be computable by the testing and calibration system 500 from image data captured from the camera's view and the camera's intrinsic parameters (such as focal length, lens distortion, etc.).

In the illustrated embodiment, the support stand 501 may be used to ensure that the fiducials will be in the field of view of the cameras 502 and the relative positions are determined as a part of the later process. However, in an alternative embodiment, the support stand 501 can also be used to fix the cameras in a known position relative to the base fiducials. In another alternative embodiment, the relative positions of a camera and base fiducial can be determined with an instrument that measures the distance between the camera view origin and the base fiducial, and the angle of the camera view axis and the fiducial surface.

During testing and calibration, the real positions of the control surfaces of the UAV may be measured and compared to the positions of those control surfaces as reported by the actuator control system 204. In one embodiment, to compare these positions in a meaningful way, the actuator control system 204 of the UAV 102 may be sent a command (via WiFi, Ethernet, or other means), from the testing and calibration system 500, to move each control surface (or any other movable part that is being calibrated) to some set position, which can be used as the basis for measurement in later steps. For example, in one embodiment, each aileron of the UAV 102 may be commanded to move to a 45 degree deflection angle relative to the wings or relative to a neutral or rest position.

After positioning 530, the camera 502 is activated to capture 535 an image that contains both the base fiducial and the movable fiducial. In the illustrated embodiment, the captured image is a black and white image, which is sufficient since the fiducials for this embodiment are a black and white pattern. If the fiducials contain color, the captured image may be a color image. The captured image data is then transferred to the testing and calibration computer for processing.

The testing and calibration computer processes the captured image to determine 540 the fiducial features in the image. This can be done using a number of different techniques. In the illustrated embodiment, the fiducial features are determined using a multi-step process. In this embodiment, the captured image is black and white (e.g., the pixels of the image are in greyscale) and the fiducials are black and white patterns. The first step is to convert the captured image into binary data using a thresholding algorithm, such as the algorithm described on page 119 of Davies, E. Roy. *Machine vision: theory, algorithms, practicalities*. Elsevier, 2004, which is hereby incorporated by reference.

The binary data produced as output by the thresholding algorithm is pixel data where all the pixels are binary (e.g., pure black or pure white, without any intermediate value pixels). These binary pixels are processed using a contour-finding algorithm, such as the algorithm described in Fu Chang and Chun-jen Chen and Chi-jen Lu, *A linear-time component-labeling algorithm using contour tracing technique, Computer Vision and Image Understanding*, 2004, which is hereby incorporated by reference. The contour-finding algorithm produces lines that form closed, curved shapes. The largest, outer-most closed shape, corresponds to the outer fiducial pattern of the fiducials 505 and 506. This outer-most closed shape is the primary fiducial feature in the captured image, which may be used to determine the position of the fiducials in the image.

After the fiducial features are determined 540 by the testing and calibration computer, the 2D orientations of the fiducials in the camera view are determined 545 based on the fiducial features. Although the word "orientation" is sometimes used to mean only the rotational pose of an object, in the instant application, "orientation" may refer to both the rotational pose and the location of the fiducial within the image that was captured by the camera. In this embodiment, to determine the 2D orientations of the fiducials, the fiducial geometries in the image data are determined based on the fiducial features.

Not all of the fiducial features are necessary to determine the fiducial geometries as the shapes of the inner fiducial patterns are not relevant to the outer shape of the fiducials, and so may be ignored for this portion of the process. The curved shape approximation of the outer fiducial pattern from the contour-finding algorithm is polygonized so that the shape from the captured image approximately fits the straight-sided polygonal shape (e.g., a 4-sided polygon, as in the illustrated example) of the outer fiducial pattern. An algorithm such as the Ramer-Douglas-Peucker algorithm may be used to perform this step. See David Douglas & Thomas Peucker, *Algorithms for the reduction of the number of points required to represent a digitized line or its caricature*, The Canadian Cartographer 10(2), 112-122 (1973), which is hereby incorporated by reference. At this point, though the rectangular fiducial has been identified within the image, it is not known if it is rotated relative to the view of the camera (e.g. the rectangular shape could be rotated such that the top of the fiducial appears as the right side of the rectangle detected in the captured image).

Once a polygonal shape that approximately fits the expected outer fiducial pattern is found by the testing and calibration computer, 2D coordinates of the corner vertices that represent the corners of the polygonal shape are determined by intersecting the lines that form the approximating polygonal shape. The pattern inside the fiducials is asymmetric and can be used to resolve any ambiguity related to the 2D orientation of the fiducial within the image (e.g., the inner fiducial pattern may be used to determine if the fiducial is in an intended or expected orientation, or whether it is rotated by 90 degrees, rotated by 180 degrees, or rotated by 270 degrees, or rotated by any other amount).

Once the 2D orientation is determined 545, the 2D coordinates of the corner vertices of the fiducials along with the known information about the camera position is used to determine 550 the 3D orientation of the fiducials in real space. As mentioned before, the word "orientation" may refer to the rotational pose of an object and the 3D location of the fiducial in real space.

In the illustrated embodiment the 3D orientation in real space is represented by the 3D coordinates of the corner vertices in a camera coordinate system, such as a coordinate system that has the camera at the origin, a positive z-axis along the camera view axis, a positive x-axis to the right (based on the FIG. shown in 5D), and a positive y-axis down (based on the FIG. shown in 5D). Determining the 3D coordinates of the corner vertices of the fiducials in the camera coordinate system can be accomplished by applying a modified form of the Perspective N-Point algorithm (PNP algorithm). A PNP algorithm may be used to determine the orientation of a camera based on the known positions of some fixed reference points in 3D real space and the 2D representations of those fixed reference points in the image view of the camera. However, in this case the PNP algorithm may be used to instead determine the unknown 3D coordinates of the fiducial's corner vertices in the camera coordinate system based on the known intrinsic parameters of the camera and the 2D coordinates of the corner vertices that were previously determined. There are many types of PNP algorithms that can be applied in this case. For example, a perspective 3-point algorithm may be used.

Once the 3D orientation of the fiducials in real space is determined, the relative orientation between the base fiducial and movable fiducial can then be determined 555. In the illustrated example, the orientation of each fiducial in real space is represented by the 3D coordinates of the corner vertices of that fiducial. The relative orientation of those fiducials can be determined by calculating the difference in the orientations of the planes formed by those corner vertices, using standard 3D geometry techniques and matrix math.

Simplifications can also be introduced into the process of determining the difference between fiducial orientations, by taking into account the physical constraints on movement of the movable parts resulting from their design. For example, in the illustrated embodiment, the control surfaces move by rotating around a hinge that is fixed to the base surface (e.g., the wing or tail of the UAV 102), and they are therefore constrained to move in a fixed curved arc. Thus, in the example, determining just the difference in angle between the fiducial surfaces may be sufficient to also determine their relative positions in space. In one embodiment, the difference in angle between the fiducial surfaces can be represented in an angle-axis form to simplify other steps of the process. Since there are two possible axis-angle representations for any rotation in real space, this ambiguity between the two representations can be resolved by enforcing some arbitrary convention. For example, a choice of axis that gives a positive dot product with the normal to the base fiducial may be enforced. Other axes or schemes may be chosen, so long as the scheme is used consistently for each fiducial.

The real position of the movable part may then be determined 560 based on the difference in orientation between the base and movable fiducials. Since the base fiducial is placed on a surface that does not move, and the movable fiducial is placed on a moving surface (such as a control surface), the real position of the moving surface can be determined 560, by the testing and calibration computer, based on the relative orientation between the base fiducial and movable fiducial.

In the illustrated embodiment, the testing and calibration computer stores a "zero offset", which corresponds to the relative position of the base fiducial and movable fiducial when the moving surface and base surface are at a "zero position". The zero position, is a starting point from which the surfaces are measured. For example, in the illustrated example, the control surface is an aileron coupled to a wing, and the zero position may be the position of the aileron when it is commanded to the position of zero deflection relative to the wing. The zero offset is the difference in orientation between the base fiducial and movable fiducial when the control surface is in the zero position.

The zero offset for each control surface on each UAV 102 may be different, and the testing and calibration system 500 may store a separate zero offset for each control surface of each UAV 102 in a database. When a UAV 102 is placed on the testing and calibration system 500, the calibration system can detect which UAV is being tested, and based on this, the testing and calibration system 500 can access the appropriate values of the zero offset for each control surface of that UAV.

The testing and calibration computer utilizes a zero offset when computing the position of a control surface, because the angle between the fiducials may not be zero at the zero position, and because impreciseness of application of the fiducials to the measured surfaces, may be such that even when the control surface and base surface are at a zero angle relative to each other, the fiducials applied to them may be at non-zero angles because of surface distortion. During calibration the real position of the moving surface relative to the base surface is determined by taking the measured relative orientation between the base fiducial and the movable fiducial and offsetting it by the zero offset, to take into account possible initial misalignment between the base and movable fiducials.

Hardware and software errors, mechanical slippages, and wear and tear on parts are detected by the testing and calibration computer by comparing 565 the real position of the movable part to the position of the movable part reported by the actuator control system 204 of the UAV 102 (the "reported position").

The difference between the real position of the movable part and the reported position from the actuator control system 204 is called the "actuator variance". If the actuator variance exceeds a threshold, the testing and calibration computer may generate a notification 570. Otherwise, the testing and calibration computer will indicate that the test has passed 575.

As described earlier, in one embodiment, the movable parts of the UAV 102 are commanded to a position by the actuator control system 204, in preparation for the testing and calibration process, in which case the reported position for a movable part will just be the position previously commanded. In an alternative embodiment, the testing and calibration system 500 can command the actuator control system 204 to move a movable part of the UAV 102 through a sequence of discrete steps and run the entire calibration process after each step. Running the process repeatedly like this can improve the calibration of a movable part by testing the accuracy of its motion across its entire range of motion, instead of just at some fixed set point.

When the actuator variance exceeds the threshold this information can trigger a notification to be sent or presented to a human operator indicating that the part that is being tested requires repair or recalibration. For example, when the actuator variance exceeds the threshold, a signal can be sent to the operator interface 312 to inform the distribution center operator 107 that the tested control surface must be repaired or recalibrated.

To recalibrate a control surface, a human operator may make physical adjustments to correct the discrepancy between the real position of the control surface and the reported position. To check the accuracy of an adjustment, the human operator can use the testing and calibration system to again test the control surface. If the calibration or repair was sufficient, the actuator variance should fall under the acceptable threshold.

The threshold that is used to decide whether or not to generate a notification can be selected based on how much actuator variance is material to a particular vehicle and control surface. If a large actuator variance is not an issue, the threshold can be set quite high (e.g. 5% variance, 10% variance, 15% variance, or any appropriate variance) without there being much material effect on a UAV flight. However, for some control surfaces actuator variance must be kept very low (e.g. 1% variance, 2% variance, 3% variance, or any appropriate variance) in order to keep the vehicle safe. For such control surfaces, when a notification is generated, the UAV 102 must be taken out of service temporarily until the actuator that moves the control surface can be calibrated or repaired to fix the discrepancy between reported position and real position of the control surface.

The testing and calibration system can also use the actuator variance to predict future failures in mechanical equipment, including the actuators that move control surfaces, by using a model that predicts equipment failure based on historical actuator variance measurements.

To use actuator variance to predict future failure in a particular control surface, for example, a dataset related to control surface failure is first collected using the testing and calibration system or similar equipment.

To collect the dataset on control surface failure the actuator control system is used to move the control surface for a testing period, and the testing and calibration system is used to measure and store the actuator variance as it changes over the testing period, until the control surface suffers a mechanical failure. This is done many times with the same type of control surface. The dataset will contain patterns in the actuator variance, and some of these patterns that occur just prior to mechanical failures will be predictive of those mechanical failures.

A predictive computer model can be may use the actuator variance patterns to predict mechanical failure in the control surface. This predictive computer model can be manually developed by observing the patterns in the actuator variance, or the predictive computer model can be automatically developed or generated using machine learning and artificial intelligence techniques.

Either way, once the predictive computer model is developed, it can take as input the actuator variance for a control surface measured over a period of time and can predict when the control surface will need to be serviced by a technician to prevent failure during a flight.

For example, a method to predict failures in a movable part of the UAV 102 can be implemented as follows. First the testing and calibration system can run a data collection process. The data collection process can run over a period of time as the UAVs 102 are operated on missions. In this data collection process, the testing and calibration system is used after every flight to determine the actuator variance for a particular movable part of interest. For example, the testing and calibration system can be used on a particular control surface for which failure prediction is desired. For the data collection process, the testing and calibration system may use the process described in FIG. 5F on the control surface after each flight, except that instead of comparing the actuator variance determined by the process to a threshold for the purpose of generating a notification, the data collection process will instead store each actuator variance measurement that is generated into a database along with performance data related to the control surface from which the actuator variance measurement was taken. This performance data will include information about control surface errors and failures.

Over time the testing and calibration system will store many actuator variances into the database along with corresponding information related to errors and failures. This database will serve as the training data for a model development process. In the model development process the training data and a machine learning algorithm may be used to generate a predictive model. The predictive model can then be used to predict failures and errors based on the historical actuator variances of a control surface, provided the control surface is of the same or similar type as the ones from which the data was collected in the data collection process (or so long as the historical actuator variances are otherwise suitable for use with the control surface being tested).

Once the predictive model is developed we use the testing and calibration system with the model to predict future failures and errors in operating UAVs. To do this the testing and calibration system is used to execute the data collection process for an operating UAV over a period of time. Again we store the actuator variances for a control surface of the UAV after every flight over the period of time. We feed these historical actuator variances into the predictive model from the model development process. When the predictive model determines that a failure or error is likely to occur in the control surface, based on the historical actuator variances, the testing and calibration system sends a notification to the operator interface 312, which can inform the distribution center operator 107 that it is time to service that particular control surface.

We claim:

1. A system comprising:
   a camera configured such that a field of view of the camera is positioned to capture a base portion and a movable portion of an aircraft;
   a computer communicatively connected to the camera, the computer configured to:
     determine a relative orientation between a base identification feature of the base portion and a movable identification feature of the movable portion of the aircraft based on image data received from the camera;
     determine a position of the movable portion of the aircraft based on the relative orientation between the base identification feature and the movable identification feature, and a position of the base portion;
     compare the position of the movable portion to a reported position for the movable portion to determine a variance; and
   an aircraft control system communicatively connected to the computer, the aircraft control system configured to monitor a state of the aircraft based on the variance.

2. The system of claim 1, wherein the movable identification feature is coupled to a surface of the movable portion and the base identification feature is coupled to a surface of the base portion.

3. The system of claim 1, wherein monitoring the state of the aircraft based on the variance comprises determining one or more of location, orientation, and speed of the aircraft based on a movement of the movable portion of the aircraft.

4. The system of claim 3, wherein the movement of the movable portion is determined based on a reported movement of the movable portion and the variance.

5. The system of claim 1, wherein determining the relative orientation between the base identification feature and the movable identification feature further comprises identifying, in the image data, fiducial features of the base identification feature and the movable identification feature.

6. The system of claim 5, wherein determining the relative orientation between the base identification feature and the movable identification feature further comprises determining fiducial geometries of the base identification feature and the movable identification feature based on the fiducial features.

7. The system of claim 1, wherein the base identification feature and the movable identification feature comprise an identifiable pattern.

8. The system of claim 1, wherein the base portion is adjacent to the movable portion and fixed relative to an aircraft reference frame.

9. The system of claim 1, wherein the reported position is a value reported by an actuator control system of the aircraft.

10. The system of claim 1, wherein the aircraft is an unmanned aerial vehicle, and the movable portion is a control surface of the unmanned aerial vehicle.

11. The system of claim 1, wherein the computer is further configured to analyze, using a predictive model, a plurality of actuator variances to determine the variance, wherein the predictive model is trained using on a plurality of historical actuator variances of the aircraft.

12. The system of claim 11, wherein the computer is further configured to predict a mechanical failure of the aircraft based on the variance and the predictive model.

13. The system of claim 11, wherein the computer is further configured to:
execute a data collection process for a second movable portion of a second aircraft and store a second plurality of actuator variances generated by the data collection process;
applying the predictive model to the second plurality of actuator variances; and
generating a notification based on output of the predictive model.

14. A method comprising:
capturing, with a camera, an image of a first portion of an aircraft including a first identification feature and a second portion of the aircraft including a second identification feature, the image comprising image data;
determining, by a computer communicatively connected to the camera and using the image data, a position of the second portion of the aircraft based on a relative orientation between the first identification feature and the second identification feature; and
updating a state of the aircraft based at least on the position of the second portion of the aircraft.

15. The method of claim 14, wherein the first identification feature is coupled to a surface of the first portion and the second identification feature is coupled to a surface of the second portion.

16. The method of claim 14, further comprising:
determining the relative orientation between the first identification feature and the second identification feature by:
identifying, in the image data, fiducial features of the first identification feature and the second identification feature, and
determining fiducial geometries of the first identification feature and the second identification feature based on the fiducial features.

17. The method of claim 14, wherein updating the state of the aircraft based at least on the position of the second portion of the aircraft comprises determining one or more of location, orientation, and speed of the aircraft based on the position of the second portion of the aircraft.

18. The method of claim 14, wherein determining the position of the second portion of the aircraft comprises adjusting a reported position of the second portion of the aircraft using an actuator variance determined based on the relative orientation between the first portion and the second portion.

19. The method of claim 18, wherein the reported position is a value reported by an actuator control system of the aircraft.

20. The method of claim 14, wherein the first portion of the aircraft is adjacent to the second portion and fixed relative to an aircraft reference frame.

21. The method of claim 14, wherein the aircraft is an unmanned aerial vehicle, and the second portion is a control surface of the unmanned aerial vehicle.

* * * * *